(12) United States Patent
Kurokawa

(10) Patent No.: US 9,860,409 B2
(45) Date of Patent: Jan. 2, 2018

(54) OPTICAL SCANNING APPARATUS

(71) Applicant: CANON KABUSHIKI KAISHA, Tokyo (JP)

(72) Inventor: Shuichi Kurokawa, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/341,333

(22) Filed: Nov. 2, 2016

(65) Prior Publication Data

US 2017/0134603 A1 May 11, 2017

(30) Foreign Application Priority Data

Nov. 6, 2015 (JP) .................................. 2015-218575

(51) Int. Cl.
| | | |
|---|---|---|
| G03G 15/04 | (2006.01) | |
| H04N 1/028 | (2006.01) | |
| G02B 26/12 | (2006.01) | |
| H04N 1/29 | (2006.01) | |

(52) U.S. Cl.
CPC ......... *H04N 1/0283* (2013.01); *G02B 26/124* (2013.01); *G03G 15/0409* (2013.01); *G03G 15/04036* (2013.01); *H04N 1/02835* (2013.01); *H04N 1/29* (2013.01); *H04N 2201/0081* (2013.01); *H04N 2201/0094* (2013.01)

(58) Field of Classification Search
CPC .... H04N 1/0283; H04N 1/02835; H04N 1/29; H04N 2201/0094; H04N 2201/0081; G03G 15/0409; G03G 15/04036; G02B 26/124
See application file for complete search history.

(56) References Cited

U.S. PATENT DOCUMENTS

| | | | |
|---|---|---|---|
| 7,633,663 B2 * | 12/2009 | Hirakawa | ............ G02B 26/123 359/196.1 |
| 9,517,637 B2 | 12/2016 | Kurokawa | |
| 9,658,449 B2 * | 5/2017 | Kudo | ................... G02B 26/124 |

(Continued)

FOREIGN PATENT DOCUMENTS

| | | | |
|---|---|---|---|
| JP | 04-050913 | * | 2/1992 |
| JP | 2005-004050 A | | 1/2005 |

(Continued)

*Primary Examiner* — G. M. Hyder
(74) *Attorney, Agent, or Firm* — Carter, DeLuca, Farrell & Schmidt, LLP

(57) ABSTRACT

Provided is an optical scanning apparatus, including: a deflector which deflects light beams with first and second deflection surfaces to scan first and second scanned surfaces in a main scanning direction; first and second imaging optical systems which guide the deflected light beams to the first and second scanned surfaces; and an incident optical system which allows the light beam to obliquely enter the first deflection surface in a sub-scanning section, in which the first imaging optical system includes a first optical element having an absolute value of curvature radius of incident surface smaller than an absolute value of curvature radius of exit surface in the sub-scanning section including an optical axis, and the incident surface of the first optical element reflects the light beam entering the incident surface toward a direction of separating from a main scanning section including the deflector in the sub-scanning section including the optical axis.

13 Claims, 8 Drawing Sheets

(56) References Cited

U.S. PATENT DOCUMENTS

| | | | | |
|---|---|---|---|---|
| 2007/0024941 | A1* | 2/2007 | Mochizuki | G02B 26/126 359/204.1 |
| 2007/0119935 | A1* | 5/2007 | Shimomura | G06K 7/10574 235/454 |
| 2007/0165099 | A1* | 7/2007 | Yoshizawa | G03G 15/04036 347/245 |
| 2008/0069585 | A1* | 3/2008 | Amada | G03G 15/326 399/94 |
| 2009/0002474 | A1* | 1/2009 | Ishibe | B41J 2/473 347/243 |
| 2009/0009841 | A1* | 1/2009 | Ishibe | G02B 26/123 359/207.1 |
| 2009/0123179 | A1* | 5/2009 | Tanimura | G02B 26/123 399/151 |
| 2009/0202273 | A1* | 8/2009 | Igarashi | G02B 26/123 399/134 |
| 2010/0014892 | A1* | 1/2010 | Shimomura | G02B 26/123 399/221 |
| 2010/0067082 | A1* | 3/2010 | Park | G02B 26/125 359/206.1 |
| 2011/0110687 | A1* | 5/2011 | Miyatake | G02B 13/0005 399/151 |
| 2012/0218363 | A1* | 8/2012 | Kato | B41J 2/473 347/118 |
| 2014/0307037 | A1* | 10/2014 | Igarashi | G03G 15/04045 347/134 |
| 2016/0124219 | A1* | 5/2016 | Kurokawa | B41J 2/00 399/51 |

FOREIGN PATENT DOCUMENTS

| | | |
|---|---|---|
| JP | 2007-010868 A | 1/2007 |
| JP | 2008-064775 A | 3/2008 |
| JP | 2009-192680 A | 8/2009 |
| JP | 2009-300982 A | 12/2009 |

* cited by examiner

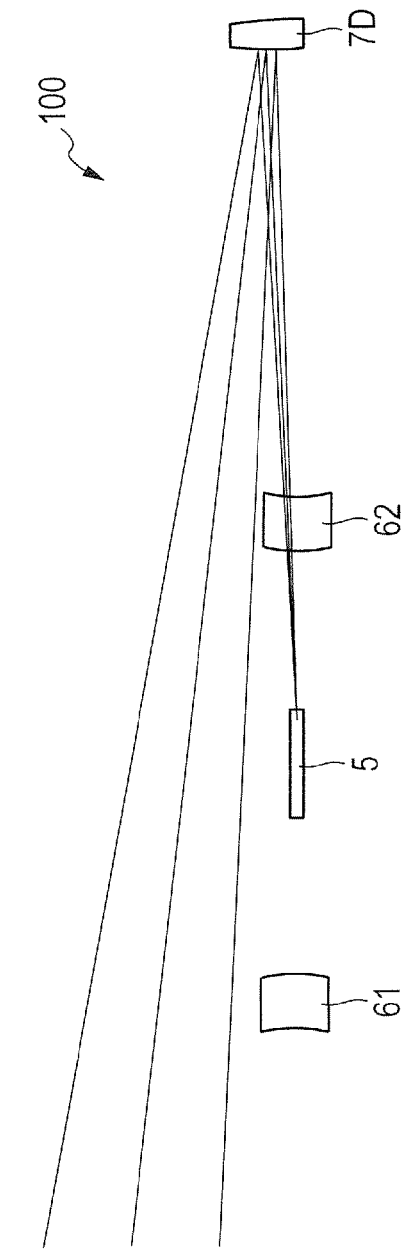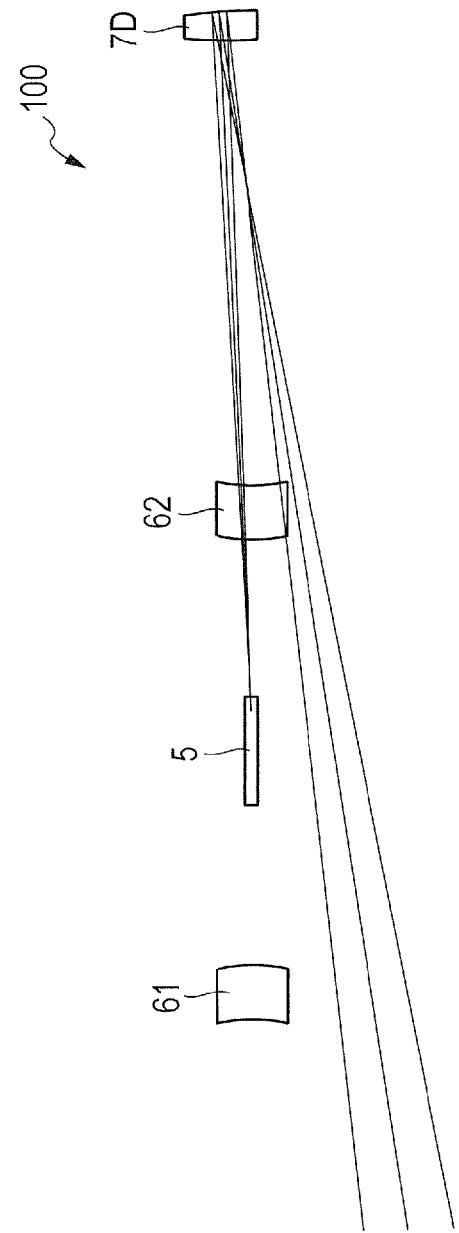

OPTICAL SCANNING APPARATUS

BACKGROUND OF THE INVENTION

Field of the Invention

The present invention relates to an optical scanning apparatus. The optical scanning apparatus is particularly suitable for image forming apparatus such as a laser beam printer, a digital copying machine, and a multifunction printer.

Description of the Related Art

In recent years, there has been practically used a tandem-type color image forming apparatus including an optical scanning apparatus configured to deflect a plurality of light beams, which are emitted from a plurality of light sources arranged so as to correspond to respective colors, by a single rotary polygon mirror, and configured to use a plurality of imaging optical systems, which are arranged so as to correspond to the respective light beams, to scan respective photosensitive drums.

In the case of using such an optical scanning apparatus described above, flare light reflected on a surface of an imaging lens included in a first imaging optical system configured to scan a photosensitive drum corresponding to a certain color may enter a second imaging optical system configured to scan a photosensitive drum corresponding to another color. With this, a photosensitive drum which is different from a photosensitive drum originally intended to be scanned may be scanned. This may cause a problem of image degradation such as occurrence of lines and density unevenness.

In order to solve such a problem, it is conceivable to apply an antireflective film on a surface of the imaging lens through vapor deposition. The reflected flare light can be reduced by application of the antireflective film. However, in recent years, a plastic lens has been often used as the imaging lens for the purpose of weight reduction and cost reduction of the optical scanning apparatus, and application of the antireflective film on a surface of such a plastic imaging lens through vapor deposition is difficult to carry out.

In Japanese Patent Application Laid-Open No. 2005-4050, there is described an optical scanning apparatus in which a light-shielding member configured to shield reflected flare light is arranged in a housing. With the light-shielding member, flare light reflected by a first imaging optical system configured to scan a photosensitive drum corresponding to a certain color is prevented from reaching a photosensitive drum corresponding to another color.

However, in the optical scanning apparatus described in Japanese Patent Application Laid-Open No. 2005-4050, there is a concern that, in a case where the imaging lens or the like is mounted at a position deviated from a desired position, an optical path of the reflected flare light may be changed to pass by the light-shielding member. In order to prevent such passage of the reflected flare light, it is conceivable to set an opening of the light-shielding member to be as narrow as possible. However, in such a case, an effective light beam for scanning a photosensitive drum which is originally intended to be scanned may also be shielded.

Further, in Japanese Patent Application Laid-Open No. 2009-192680, there is described an optical scanning apparatus in which an imaging optical element having a positive refractive power is arranged between a light-shielding member and an optical surface of an imaging lens causing generation of flare light. With this, the reflected flare light reaching the light-shielding member is transformed into a converged light beam, thereby reducing a change in passing position of the reflected flare light on the light-shielding member due to assembling error of the imaging lens or the like.

However, when attention is focused on one imaging optical system, there are arranged two imaging optical elements having a positive refractive power, and hence a sub-scanning magnification of the imaging optical system is increased. As a result, there arises a concern that degradation of the imaging performance due to the assembling error of the imaging lens or the like may be worsened.

Therefore, according to the present invention, there is provided an optical scanning apparatus capable of preventing entry of flare light reflected on a first optical element of a first imaging optical system into a second imaging optical system even when there is a change in position of the first optical element due to an assembling error or the like.

SUMMARY OF THE INVENTION

According to one embodiment of the present invention, there is provided an optical scanning apparatus, including: a deflector configured to deflect light beams with first and second deflection surfaces to scan first and second scanned surfaces in a main scanning direction; first and second imaging optical systems configured to guide the light beams deflected by the first and second deflection surfaces to the first and second scanned surfaces; and an incident optical system configured to allow the light beam to obliquely enter the first deflection surface in a sub-scanning section, in which the first imaging optical system includes a first optical element having an absolute value of a curvature radius of an incident surface smaller than an absolute value of a curvature radius of an exit surface in the sub-scanning section including an optical axis, and the incident surface of the first optical element is configured to reflect the light beam entering the incident surface toward a direction of separating from a main scanning section including the deflector in the sub-scanning section including the optical axis.

Further features of the present invention will become apparent from the following description of exemplary embodiments with reference to the attached drawings.

BRIEF DESCRIPTION OF THE DRAWINGS

FIG. 3A is a sub-scanning sectional view of a part of the imaging optical system of the optical scanning apparatus according to the first embodiment.

FIG. 3B is a sub-scanning sectional view of a part of the imaging optical system of the optical scanning apparatus according to the first embodiment.

DESCRIPTION OF THE EMBODIMENTS

Now, an optical scanning apparatus according to embodiments of the present invention is described with reference to the attached drawings. Note that, the drawings to be referred to below may be drawn to the scale different from the reality in some cases in order to facilitate understanding of the present invention.

In the following description, a main scanning direction corresponds to a direction perpendicular to a rotation axis of a deflector and an optical axis of an imaging optical system, and a sub-scanning direction corresponds to a direction parallel to the rotation axis of the deflector. Further, a main scanning section corresponds to a section perpendicular to the sub-scanning direction, and a sub-scanning section corresponds to a section perpendicular to the main scanning direction.

First Embodiment

Figure 1:
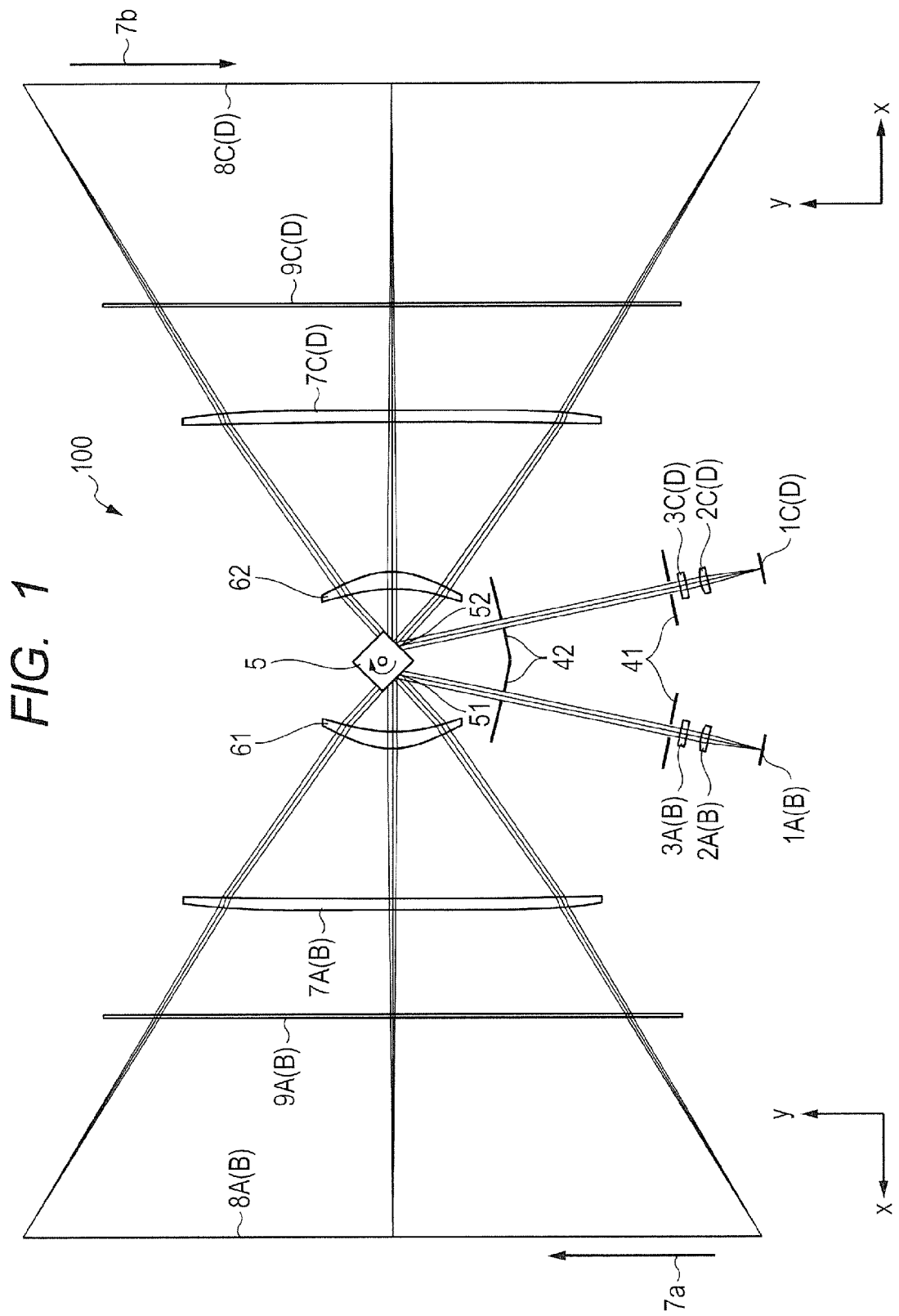
FIG. 1 is a main scanning sectional view of an optical scanning apparatus according to a first embodiment of the present invention.
Figure 2:
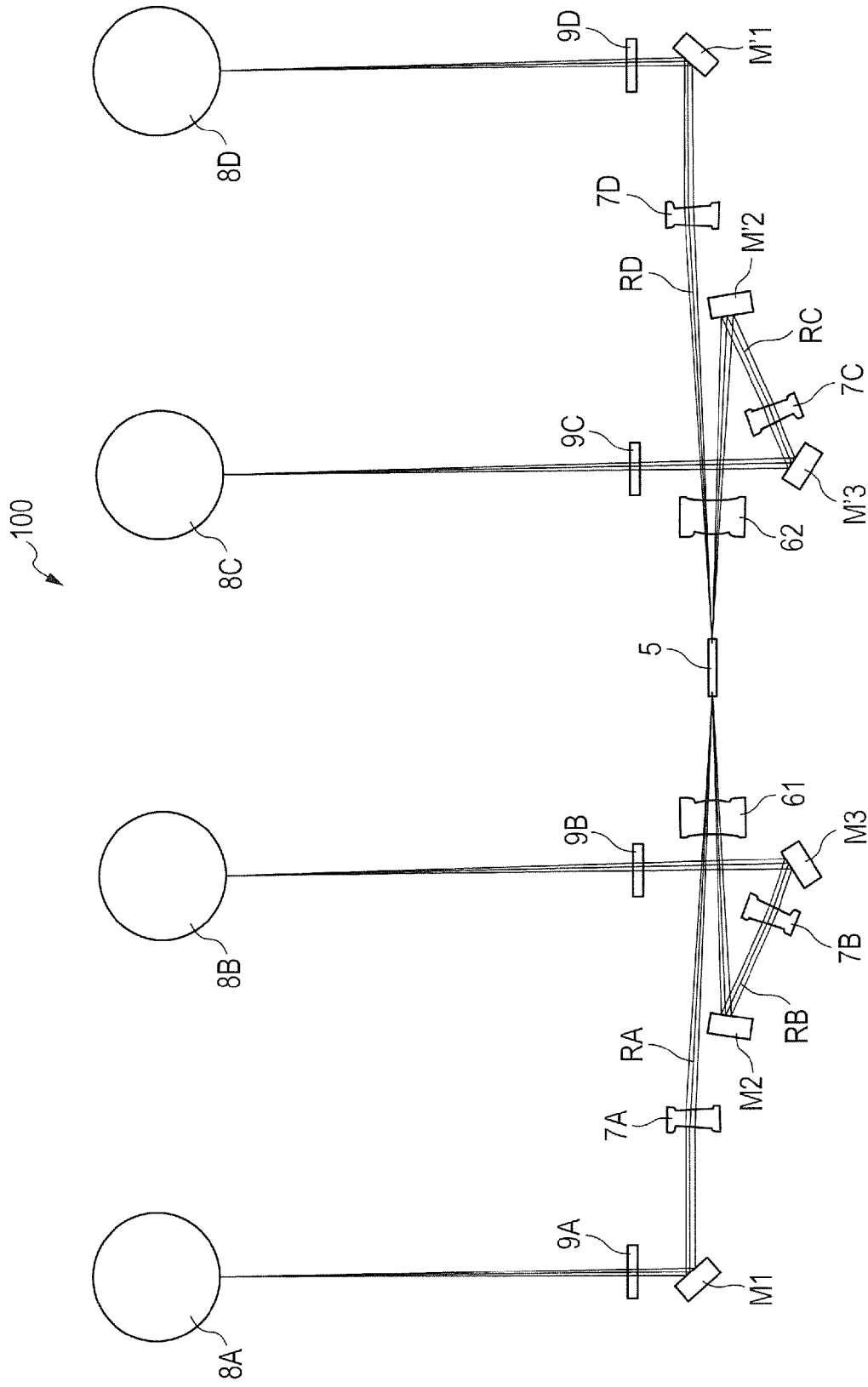
FIG. 2 is a sub-scanning sectional view of an imaging optical system of the optical scanning apparatus according to the first embodiment.

FIG. 1 is a main scanning sectional view of an optical scanning apparatus 100 according to a first embodiment of the present invention. FIG. 2 is a sub-scanning sectional view of an imaging optical system of the optical scanning apparatus 100 according to the first embodiment. It should be noted that, in FIG. 1, reflection of optical paths by reflection mirrors M1, M2, M3, M'1, M'2, and M'3 is developed, and each reflection mirror is omitted.

The optical scanning apparatus 100 includes light sources 1A, 1B, 1C, and 1D, coupling lenses 2A, 2B, 2C, and 2D, cylindrical lenses 3A, 3B, 3C, and 3D, sub-scanning stops (diaphragms) 41, and main scanning stops 42. Further, the optical scanning apparatus 100 includes a deflector 5, first imaging lenses 61 and 62, second imaging lenses (first optical elements) 7A, 7B, 7C, and 7D, dust-proof glasses 9A, 9B, 9C, and 9D, and the reflection mirrors M1, M2, M3, M'1, M'2, and M'3.

In this embodiment, the light sources 1A to 1D, the coupling lenses 2A to 2D, the cylindrical lenses 3A to 3D, the sub-scanning stops 41, and the main scanning stops 42 construct incident optical systems.

Further, in this embodiment, the first imaging lenses 61 and 62, the second imaging lenses 7A to 7D, the dust-proof glasses 9A to 9D, and the reflection mirrors M1 to M'3 construct imaging optical systems.

The light sources 1A and 1B are arranged so that angles formed between emitted light beams and the main scanning section take predetermined angles of −2.7° and +2.7°, respectively. This configuration is hereinafter described as oblique incidence at predetermined angles of −2.7° and +2.7° with respect to a first reflection surface of the deflector 5 (sub-scanning obliquely-incident optical system).

Similarly, the light sources 1C and 1D are arranged so that angles formed between emitted light beams and the main scanning section take predetermined angles of +2.7° and −2.7°, respectively. This configuration is hereinafter described as oblique incidence at predetermined angles of +2.7° and −2.7° with respect to a second reflection surface 52 of the deflector 5.

The sub-scanning stops 41 have four openings corresponding to the light sources. Further, the main scanning stops 42 have two openings in total, including one opening corresponding to the light sources 1A and 1B and one opening corresponding to the light sources 1C and 1D.

In this embodiment, two kinds of optical elements are used, including the coupling lenses 2A to 2D and the cylindrical lenses 3A to 3D. However, the optical element is not limited thereto. One kind of optical element such as an anomorphic collimator lens having different power in the main scanning direction and in the sub-scanning direction may be used.

As illustrated in FIG. 1, the light beams emitted from the light sources 1A and 1B are transformed into substantially parallel light beams by the coupling lenses 2A and 2B, respectively. After that, the light beams enter the cylindrical lenses 3A and 3B, respectively, and are refracted only in the sub-scanning direction. Here, the substantially parallel light beams include weak divergent light beams, weak convergent light beams, and parallel light beams.

The light beams having passed through the cylindrical lenses 3A and 3B are restricted in a light beam shape along the sub-scanning direction (width of light beam in sub-scanning direction) by the sub-scanning stop 41, and restricted in a light beam shape along the main scanning direction (width of light beam in main scanning direction) by the main scanning stop 42. The restricted light beams are condensed only in the sub-scanning direction onto the first reflection surface (first deflection surface) 51 of the deflector 5 and formed into an image as a line image which is long in the main scanning direction.

Similarly, as illustrated in FIG. 1, the light beams emitted from the light sources 1C and 1D are transformed into substantially parallel light beams by the coupling lenses 2C and 2D, respectively. After that, the light beams enter the cylindrical lenses 3C and 3D, respectively, and are refracted only in the sub-scanning direction.

The light beams having passed through the cylindrical lenses 3C and 3D are restricted in a light beam shape along the sub-scanning direction (width of light beam in sub-scanning direction) by the sub-scanning stop 41, and restricted in a light beam shape along the main scanning direction (width of light beam in main scanning direction) by the main scanning stop 42. The restricted light beams are condensed only in the sub-scanning direction onto the second reflection surface (second deflection surface) 52 of the deflector 5 and formed into an image as a line image which is long in the main scanning direction.

A light beam RA emitted from the light source 1A and then reflected and deflected by the first reflection surface 51 passes through the first imaging lens 61, the second imaging lens 7A, the reflection mirror M1, and the dust-proof glass 9A as illustrated in FIG. 2, and is formed into an image as light spots on (guided to) a scanned surface 8A.

Similarly, a light beam RB emitted from the light source 1B and then reflected and deflected by the first reflection surface 51 passes through the first imaging lens 61, the reflection mirror M2, the second imaging lens 7B, the reflection mirror M3, and the dust-proof glass 9B, and is formed into an image as light spots on (guided to) a scanned surface 8B.

The deflector 5 is rotated in the direction of the arrow in FIG. 1 by a motor (not shown) so that the light spots scan the scanned surfaces 8A and 8B in a direction 7a, thereby forming electrostatic latent images thereon.

Further, a light beam RC emitted from the light source 1C and then reflected and deflected by the second reflection surface 52 passes through the first imaging lens 62, the reflection mirror M'2, the second imaging lens 7C, the reflection mirror M'3, and the dust-proof glass 9C, and is formed into an image as light spots on (guided to) a scanned surface 8C.

Similarly, a light beam RD emitted from the light source 1D and then reflected and deflected by the second reflection surface 52 passes through the first imaging lens 62, the second imaging lens 7D, the reflection mirror M'1, and the dust-proof glass 9D, and is formed into an image as light spots on (guided to) a scanned surface 8D.

The deflector 5 is rotated in the direction of the arrow in FIG. 1 by the motor (not shown) so that the light spots scan the scanned surfaces 8C and 8D in a direction 7b, thereby forming electrostatic latent images thereon.

In a case where the optical scanning apparatus 100 according to this embodiment is used for a tandem-type color image forming apparatus, photosensitive drums for four different colors including yellow, magenta, cyan, and black are arranged at positions of the four scanned surfaces 8A, 8B, 8C, and 8D, respectively.

The first imaging lenses 61 and 62 are arranged symmetrically over the deflector 5 so as to allow the light beams RA and RB and the light beams RC and RD to pass therethrough, respectively.

Further, among the second imaging lenses 7A to 7D individually arranged on the respective optical paths, the second imaging lenses 7A and 7B have the same shape and are arranged so as to be inverted with each other in the sub-scanning direction with respect to the optical paths. Similarly, the second imaging lenses 7C and 7D have the same shape and are arranged so as to be inverted with each other in the sub-scanning direction with respect to the optical paths.

It should be noted that, as illustrated in FIG. 1, different definitions of coordinate systems are given to the imaging optical system configured to condense the light beams onto the scanned surfaces 8A and 8B and the imaging optical system configured to condense the light beams onto the scanned surfaces 8C and 8D.

Next, various characteristics of each optical system included in the optical scanning apparatus 100 according to this embodiment are shown in Table 1. Here, "E±x" represents "$10^{\pm x}$". Further, coefficients which are not particularly described are all zero.

TABLE 1

| Configuration of Incident Optical System/Arrangement of Imaging Optical System | | | | Surface Data of Imaging Optical System Lens | | | | |
|---|---|---|---|---|---|---|---|---|
| | | | | | First Imaging Lenses 61 and 62 | | Second Imaging Lenses 7A to 7D | |
| | | | | | Incident Surface | Exit Surface | Incident Surface | Exit Surface |
| Light Source Wavelength | λ(nm) | 790 | | R | -5.42327E+01 | -3.59576E+01 | -4.00000E+03 | 3.37362E+02 |
| Number of Light Emission Points | N | 2 | Meridional Line | K | -4.74716E+00 | -1.24764E+00 | 0.00000E+00 | -9.80481E+01 |
| Thickness of Laser Cover Glass | dcg(mm) | 0.25000 | | B2 | 0.00000E+00 | 0.00000E+00 | 0.00000E+00 | 0.00000E+00 |
| Refractive Index of Laser Cover Glass | n0 | 1.51052 | | B4 | 3.35780E-07 | 5.80106E-07 | 0.00000E+00 | -2.48270E-07 |
| Light Emission Point of Light Source 1 to First Surface of Collimator Lens 2 | d0(mm) | 23.33500 | | B6 | 3.78618E-09 | 1.86177E-09 | 0.00000E+00 | 2.47191E-11 |
| Curvature Radius of First Surface of Collimator Lens 2 | R1(mm) | ∞ | | B8 | -3.82234E-12 | 8.49208E-13 | 0.00000E+00 | -1.74993E-15 |
| Curvature Radius of Second Surface of Collimator Lens 2 | R2(mm) | -19.04573 | | B10 | 8.78140E-16 | -1.54397E-15 | 0.00000E+00 | 5.97661E-20 |
| Thickness of Collimator Lens 2 | d1(mm) | 3.00000 | | B12 | 0.00000E+00 | 0.00000E+00 | 0.00000E+00 | 0.00000E+00 |
| Refractive Index of Collimator Lens 2 | n1 | 1.76167 | | | | | | |
| Second Surface of Collimator Lens 2 to First Surface of Cylindrical Lens 3 | d2(mm) | 7.04500 | Sagittal Line | r | 3.00000E+01 | 3.00000E+01 | 4.00000E+01 | -1.22300E+02 |
| Curvature Radius of First Surface of Cylindrical Lens 3 in Sub-scanning Direction | Rs3(mm) | 68.48089 | | k | 0.00000E+00 | 0.00000E+00 | 0.00000E+00 | 0.00000E+00 |
| Curvature Radius of First Surface of Cylindrical Lens 3 in Main Scanning Direction | Rm3(mm) | ∞ | | D1 | 0.00000E+00 | 8.38763E-04 | 0.00000E+00 | 1.63324E-04 |
| Curvature Radius of Second Surface of Cylindrical Lens 3 in Sub-scanning Direction | Rs4(mm) | ∞ | | D2 | 0.00000E+00 | -2.19941E-06 | 7.31782E-05 | 1.48791E-04 |
| Curvature Radius of Second Surface of Cylindrical Lens 3 in Main Scanning Direction | Rm4(mm) | ∞ | | D3 | 0.00000E+00 | 3.09407E-06 | 0.00000E+00 | 1.15381E-07 |
| Thickness of Cylindrical Lens 3 | d3(mm) | 3.00000 | | D4 | 0.00000E+00 | -7.17059E-07 | 0.00000E+00 | -2.95106E-08 |
| Refractive Index of Cylindrical Lens 3 | n2 | 1.52397 | | D5 | 0.00000E+00 | -3.21330E-09 | 0.00000E+00 | -1.55040E-11 |
| Second Surface of Cylindrical Lens 3 to Sub-scanningStop 41 | d4(mm) | 3.42100 | | D6 | 0.00000E+00 | 1.36244E-09 | 0.00000E+00 | 4.01476E-12 |
| Sub-scanning Stop 41 to Main Scanning Stop 42 | d5(mm) | 69.13565 | | D7 | 0.00000E+00 | -6.24002E-12 | 0.00000E+00 | -4.57398E-16 |
| Main Scanning Stop 42 to Axial Deflection/Reflection Surfaces 51 and 52 | d6(mm) | 57.06335 | | D8 | 0.00000E+00 | 1.03652E-12 | 0.00000E+00 | -4.80489E-16 |
| Axial Deflection/Reflection Surfaces 51 and 52 to Incident Surfaces of First Imaging Lenses 61 and 62 | d7(mm) | 26.00000 | | D9 | 0.00000E+00 | 6.44169E-15 | 0.00000E+00 | 8.88424E-20 |
| Thickness of First Imaging Lenses 61 and 62 | d8(mm) | 7.80000 | | D10 | 0.00000E+00 | -1.93439E-15 | 0.00000E+00 | 2.87488E-20 |
| Refractive Index of First Imaging Lenses 61 and 62 | n3 | 1.52397 | | D11 | 0.00000E+00 | 0.00000E+00 | 0.00000E+00 | 0.00000E+00 |
| Exit Surfaces of First Imaging Lenses 61 and 62 to Incident Surfaces of Second Imaging Lenses 7A to 7D | d9(mm) | 66.20000 | | D12 | 0.00000E+00 | 0.00000E+00 | 0.00000E+00 | 0.00000E+00 |
| Thickness of Second Imaging lenses 7A to 7D | d10(mm) | 4.30000 | | D13 | 0.00000E+00 | 0.00000E+00 | 0.00000E+00 | 0.00000E+00 |
| Refractive Index of Second Imaging Lenses 7A to 7D | n4 | 1.52397 | | G0, 1 | | | 3.20000E-02 | -5.60000E-02 |
| Exit Surfaces of Second Imaging Lenses 7A to 7D to Incident Surfaces of Dust-proof Glasses 9A to 9D | d11(mm) | 47.60000 | | G1, 1 | | | | |
| Thickness of Dust-proof Glasses 9A to 9D | d12(mm) | 1.80000 | | G2, 1 | | | -2.28635E-04 | -2.15261E-04 |
| Refractive Index of Dust-proof Glasses 9A to 9D | n5 | 1.51052 | | G3, 1 | | | 1.49972E-05 | 2.35632E-05 |
| From Exit Surfaces of Dust-proof Glasses 9A to 9D to Scanned Surfaces 8A to 8D | d13(mm) | 96.30000 | | | | | -2.04294E-08 | -9.53275E-09 |
| Incident Angle of Deflector 5 of Incident Optical System in Main Scanning Direction | α(deg) | 78.00000 | | G4, 1 | | | 7.30926E-10 | -2.21106E-09 |
| Incident Angle of Deflector 5 of Incident Optical System in Sub-scanning Direction | β(deg) | 2.70000 | | G5, 1 | | | 7.21351E-12 | 1.30626E-12 |
| Effective Scanning Angle | γ(deg) | ±40.62792 | | G6, 1 | | | -6.01610E-13 | 3.42314E-13 |

TABLE 1-continued

| Configuration of Incident Optical System/Arrangement of Imaging Optical System | | | Surface Data of Imaging Optical System Lens | | | |
|---|---|---|---|---|---|---|
| | | | First Imaging Lenses 61 and 62 | | Second Imaging Lenses 7A to 7D | |
| | | | Incident Surface | Exit Surface | Incident Surface | Exit Surface |
| Light Source Wavelength | λ(nm) | 790 | | | | |
| Number of Light Emission Points | N | 2 | | | | |
| Effective Scanning Width | Ym(mm) | ±156 | | | −4.16035E−16 | 4.35080E−16 |
| Number of Surfaces of Deflector 5 | Men | 4 | | | 1.60474E−17 | −1.04186E−16 |
| Circumscribed Circle Radius of Deflector 5 | Rpol(mm) | 10.00000 | | | −3.63394E−20 | −7.63876E−20 |
| Center Position of Deflector 5 (Optical Axis Direction of Imaging Optical System) | PX(mm) | −5.92900 | | | 2.83397E−21 | 7.82718E−21 |
| Center Position of Deflector 5 (Deflection Scanning Direction) | PY(mm) | 3.91500 | | | 0.00000E+00 | 0.00000E+00 |
| Aperture Stop Diameter (Main Scanning Stop 42 × Sub-scanning Stop 41) | Rectangle (mm) | 3.94 × 2.77 | | | 0.00000E+00 | 0.00000E+00 |

\* The refractive index is a refractive index with respect to a wavelength of 790 nm.

In the respective optical surfaces of the first imaging lenses 61 and 62 and the second imaging lenses 7A to 7D, a meridional line shape (shape in main scanning section) is represented by Expression (1).

$$X = \frac{\frac{Y^2}{R}}{1 + \sqrt{1 - (1+K)\left(\frac{Y}{R}\right)^2}} + \sum_{i=2}^{6} B_{2i} Y^{2i} \quad (1)$$

In Expression (1), with a crossing point between each optical surface and an optical axis as an origin, there are provided an optical axis direction being an X-axis, an axis orthogonal to the optical axis in the main scanning direction being a Y-axis, and an axis orthogonal to the optical axis in the sub-scanning direction being a Z-axis.

Further, R represents a curvature radius, K represents an eccentricity, and $B_4$, $B_6$, $B_8$, $B_{10}$, and $B_{12}$ represent aspherical coefficients of fourth-order, sixth-order, eighth-order, tenth-order, and twelfth-order meridional lines, respectively.

Further, in the respective optical surfaces of the first imaging lenses 61 and 62 and the second imaging lenses 7A to 7D, a sagittal line shape (shape in sub-scanning section) is represented by Expression (2).

$$S = \frac{\frac{Z^2}{r'}}{1 + \sqrt{1 - (1+k)\left(\frac{Z}{r'}\right)^2}} + \sum_{n=1}^{16}\sum_{m=0}^{16} G_{mn} Y^m Z^n, \quad (2)$$

$$r' = r\left(1 + \sum_{i=1}^{16} D_i Y^i\right)$$

Here, a sagittal line curvature radius r' varies in accordance with a position Y in the main scanning direction with respect to a curvature radius r of the sagittal line on the optical axis (Y=0), and $D_1$ to $D_{13}$ represent variation coefficients of the sagittal line curvature radius r'.

In Expression (2), $\Sigma G_{mn} Y^m$ represents an n-th order aspherical coefficient of a sagittal line. Thus, when a term in which m is not 0 is included, the aspherical coefficient of the sagittal line varies in accordance with the position Y in the main scanning direction. In this embodiment, the incident surface and exit surface of the imaging lenses 7A to 7D have a first aspheric term of Z. Specifically, the incident surface and exit surface of the imaging lenses 7A to 7D are formed into tilt variation surfaces having variation in a tilt amount of each lens surface in the sub-scanning direction in accordance with the position Y in the main scanning direction in order to correct degradation of wavefront aberration and bending of the scanning line caused by being the sub-scanning obliquely-incident optical system.

Tilt angles of the imaging lenses 7A to 7D in the sub-scanning direction on the optical axis are 1.8 degrees at the incident surface and −3.2 degrees at the exit surface.

In this embodiment, the imaging lenses 7A to 7D are arranged so as to be eccentric by 4.64 mm in the sub-scanning direction to allow an incident light beam to pass near the origin for the shape definition. As described above, the imaging lenses 7A to 7D have a tilt angle in the sub-scanning direction also on the optical axis, and hence the origin for the shape definition and the surface vertex (point most protruding in the optical axis direction) do not match.

As described above, the second imaging lenses 7A and 7B have the same shape and are arranged so as to be inverted with each other in the sub-scanning direction with respect to the optical paths. Similarly, the second imaging lenses 7C and 7D have the same shape and are arranged so as to be inverted with each other in the sub-scanning direction with respect to the optical paths.

Further, in this embodiment, the first imaging lenses 61 and 62 and the second imaging lenses 7A to 7D are all plastic-molded lenses.

Next, effects of this embodiment are described.

In the optical scanning apparatus 100 of this embodiment, the imaging optical systems are arranged on both sides over the deflector 5, and a plurality of photosensitive drums are scanned with different reflection surfaces (first reflection surface 51 and second reflection surface 52) of the same deflector 5. In such an optical scanning apparatus, there is a case where flare light reflected by the optical surface of the imaging lens in one imaging optical system enters another imaging optical system. In such a case, the flare light may reach a photosensitive drum which is not originally intended to be scanned, thereby causing image degradation.

Therefore, in the optical scanning apparatus 100 according to this embodiment, the first imaging lenses 61 and 62 are configured such that, as shown in Table 1, each of the optical surfaces (that is, the incident surface and the exit surface) is convex toward the deflector 5. With this, the flare light reflected by each of the optical surfaces of the first imaging lenses 61 and 62 passes above and/or below the deflector 5 in the sub-scanning direction, thereby being prevented from entering another imaging optical system arranged over the deflector 5.

FIG. 3A and FIG. 3B are sub-scanning sectional views for illustrating a part of the image optical system of the optical scanning apparatus 100 according to the first embodiment.

As illustrated in FIG. 3A and FIG. 3B, in the optical scanning apparatus 100 according to this embodiment, for example, the second imaging lens 7D is configured such that the flare light reflected by the incident surface and the exit surface travels above and below the deflector 5 in the sub-scanning direction. With this, the flare light reflected by the second imaging lens 7D is prevented from entering the imaging optical system on the opposite side over the deflector 5 (that is, the first imaging lens 61 side).

The second imaging lenses 7A, 7B, and 7C are also configured similarly to the above-mentioned second imaging lens 7D.

The travelling direction of the flare light to be reflected by the second imaging lenses 7A to 7D can be changed by tilt angles in the sub-scanning direction of the incident surfaces and the exit surfaces of the second imaging lenses 7A to 7D.

For example, as Comparative Example 1, the case of tilting the incident surface further in a positive direction and tilting the exit surface further in a negative direction is considered. That is, the case where a relative difference between the tilt angles of the incident surface and the exit surface becomes larger is considered. Here, with regard to positive and negative of the tilt angle, such a case is defined as being positive that the incident surface of the lens is tilted in the sub-scanning section along the travelling direction of the light beam passing through the lens to approach the exit surface.

Figure 4A:
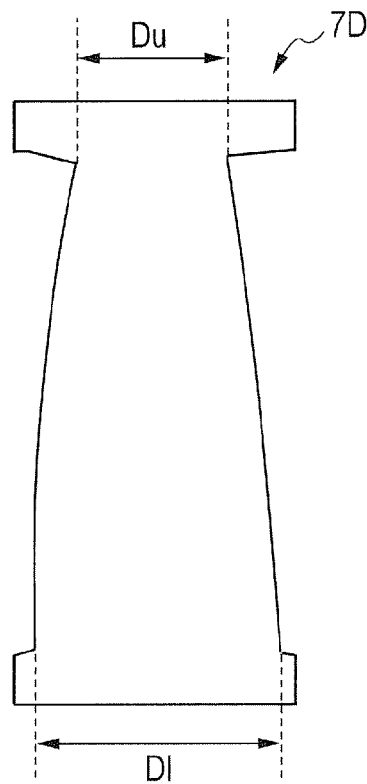
FIG. 4A is a sub-scanning sectional view of a second imaging lens according to Comparative Example 1.

FIG. 4A is a sub-scanning sectional view for illustrating the second imaging lens 7D according to Comparative Example 1.

As illustrated in FIG. 4A, when the relative difference between the tilt angles of the incident surface and the exit surface becomes larger as in Comparative Example 1, the shape asymmetry of the second imaging lens 7D along the sub-scanning direction becomes more significant. Specifically, a difference between a thickness Du at an upper end in the sub-scanning direction and a thickness Dl at a lower end in the sub-scanning direction becomes larger.

As the difference in the thickness becomes larger, a difference in cooling time periods between the small thickness side and the large thickness side becomes larger, and hence there is a concern that molding stability is deteriorated.

Therefore, it is preferred that an absolute value of a difference in tilt angles in the sub-scanning direction of the incident surface and the exit surface on the optical axis be 6 degrees or less.

In the optical scanning apparatus 100 according to this embodiment, the width of the optical surfaces of the second imaging lenses 7A to 7D along the sub-scanning direction is about 10 mm.

Thus, the thickness difference in both end portions in the sub-scanning direction can be reduced to about 1 mm by setting the relative difference in the tilt angles in the sub-scanning direction of the incident surface and the exit surface on the optical axis to 6 degrees or less, thereby being capable of reducing the adverse effect on the molding stability.

Next, as Comparative Example 2, the case where the tilt angles in the sub-scanning direction of the incident surface and the exit surface on the optical axis are both positive is considered.

In this case, the second imaging lenses 7A to 7D are designed to allow flare light reflected by the incident surface and the exit surface of the second imaging lenses 7A to 7D to pass above the deflector 5 in the sub-scanning direction so that the flare light does not enter the imaging optical system arranged on the opposite side over the deflector 5.

Figure 4B:
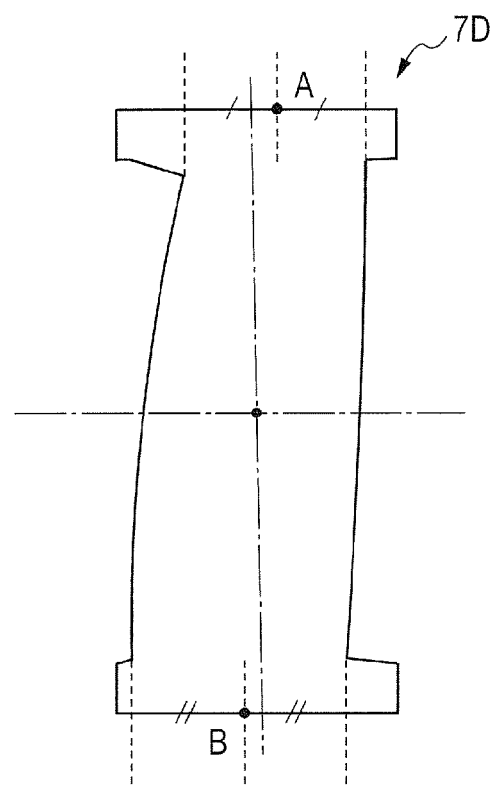
FIG. 4B is a sub-scanning sectional view of a second imaging lens according to Comparative Example 2.

FIG. 4B is a sub-scanning sectional view for illustrating the second imaging lens 7D according to Comparative Example 2.

As illustrated in FIG. 4B, in the case of Comparative Example 2, the tilt angles in the sub-scanning direction of the incident surface and the exit surface of the second imaging lens 7D on the optical axis are both positive. Thus, a center point A of a thickness of an upper end in the sub-scanning direction of the second imaging lens 7D (that is, a midpoint of a distance between the incident surface and the exit surface) is significantly deviated in the optical axis direction with respect to a center point B of a thickness of a lower end in the sub-scanning direction of the second imaging lens 7D.

Therefore, rotational moment causing the second imaging lens 7D to rotate toward the exit surface side becomes more liable to be generated, with the result that there is difficulty in stabilizing orientation of the second imaging lens 7D. Further, there is a concern that the molding stability of the second imaging lens 7D is also adversely affected.

The same holds true also in the case where the tilt angles in the sub-scanning direction of the incident surface and the exit surface on the optical axis are both negative.

In order to avoid the problem described above, it is preferred that absolute values of the tilt angles of the incident surface and the exit surface in the sub-scanning direction on the optical axis be 8 degrees or less.

For example, when the tilt angle of the incident surface of the second imaging lens 7D is +8 degrees, the tilt angle of the exit surface of the second imaging lens 7D, which may maximize the deviation amount of the center point A of the thickness at the upper end in the sub-scanning direction in the optical axis direction with respect to the center point B of the thickness at the lower end in the sub-scanning direction of the second imaging lens 7D, is +8 degrees.

The deviation amount in the optical axis direction at that time is about 1.4 mm when the width of the optical surfaces of the second imaging lens 7D along the sub-scanning direction is about 10 mm. In other words, the deviation amounts in the optical axis direction from the lens center to the center point A of the thickness and to the center point B of the thickness are about 0.7 mm. Thus, the adverse effect on the molding stability can be reduced.

Further, the center thickness of the second imaging lenses 7A to 7D is at least 4 mm. That is, the deviation amount of the center point A of the thickness with respect to the center point B of the thickness in the optical axis direction is equal to or less than one half of the center thickness. Thus, generation of the rotational moment can also be suppressed.

When there is a change in position of each of the optical elements such as the coupling lenses 2A to 2D, through which the light beams RA to RD pass, due to the assembling error or the like, the height of incidence of the light beams RA to RD to the second imaging lenses 7A to 7D is changed. Thus, the optical path of the flare light reflected by the second imaging lenses 7A to 7D is also changed. Further, as a matter of course, the optical path of the reflected flare light may be changed also by the change in position of the second imaging lenses 7A to 7D due to the assembling error.

Consequently, even when the tilt angles of the incident surface and the exit surface in the sub-scanning direction are set in the second imaging lenses 7A to 7D so as not to allow the reflected flare light to enter the imaging optical system arranged on the opposite side over the deflector 5, there is a possibility that entry of the reflected flare light may be caused by positional changes due to the influence of the assembling error or the like.

Therefore, in this embodiment, conditions are set also for a curvature radius in the sub-scanning section of each of the optical surfaces of the second imaging lenses 7A to 7D.

Specifically, the second imaging lenses 7A to 7D are designed so that an absolute value of a curvature radius in the sub-scanning section of the incident surface of the second imaging lenses 7A to 7D becomes smaller than an absolute value of a curvature radius in a sub-scanning section of the exit surface.

With this, even when there is a change in position of the second imaging lenses 7A to 7D due to the assembling error or the like, entry of the flare light reflected by the second imaging lenses 7A to 7D into the imaging optical system arranged on the opposite side over the deflector 5 can be effectively prevented.

Now, a specific design of the second imaging lenses 7A to 7D with regard to the absolute value of the curvature radius in the sub-scanning section of each optical surface is described in detail.

First, a height of incidence of the light beams RA to RD entering the second imaging lenses 7A to 7D from the surface vertex in the sub-scanning direction in the case where there is no change in position due to the assembling error or the like is represented by Z. Further, it is assumed that the height of incidence of the light beams RA to RD entering the imaging lenses 7A to 7D from the surface vertex in the sub-scanning direction is changed by Δz due to the assembling error or the like of the second imaging lenses 7A to 7D. Further, the curvature radius of the incident surface or the exit surface of the second imaging lenses 7A to 7D in the sub-scanning section is represented by r.

At this time, a change Δφ in the normal line angle of the incident surface or the exit surface of the second imaging lenses 7A to 7D at incident positions of the light beams RA to RD due to the change in height of incidence of the light beams RA to RD is represented by Expression (3).

$$\Delta\phi = \frac{180}{\pi}\left(\arctan\left(\frac{Z+\Delta z}{r}\right) - \arctan\left(\frac{Z}{r}\right)\right) \quad (3)$$

Figure 5:
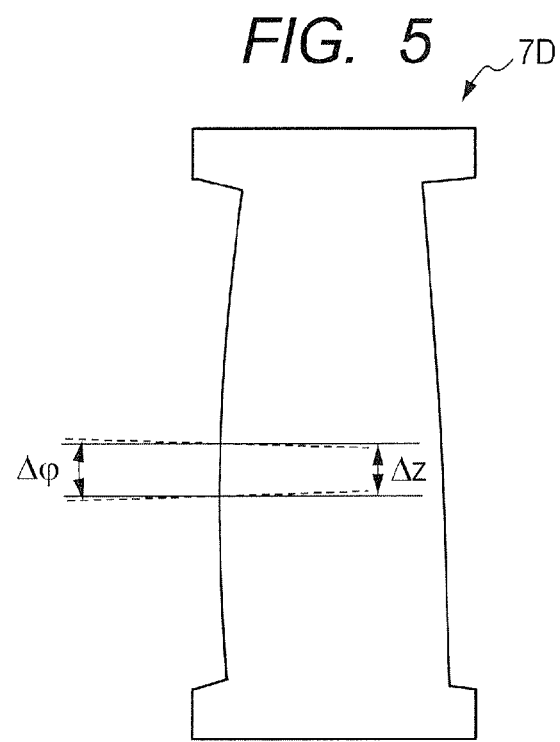
FIG. 5 is a view for illustrating, in the second imaging lens of the optical scanning apparatus according to the first embodiment, a change Δz in a height of incidence of a light beam entering the second imaging lens from a surface vertex in a sub-scanning direction and a change Δφ in a normal line angle of the optical surface of the second imaging lens at an incident position of the light beam due to the change in height of incidence of the light beam.

FIG. 5 is a specific illustration of the change Δz in the height of incidence and the change Δφ in the normal line angle described above in the second imaging lenses 7A to 7D of the optical scanning apparatus 100 according to this embodiment.

Typically, r is tens of millimeters at least, whereas Z is several millimeters at most. Further, the Δz is smaller than Z, and hence Expression (3) can be approximated as in Expression (4).

$$\Delta\phi \cong \frac{180\Delta z}{\pi r} \quad (4)$$

Thus, a change Δθ in the reflection angle of the flare light reflected by the second imaging lenses 7A to 7D can be represented by Expression (5).

$$\Delta\theta = 2\Delta\phi = \frac{360\Delta z}{\pi r} \quad (5)$$

Thus, a change of the optical path of the flare light reflected by the second imaging lenses 7A to 7D along with the change in height of incidence of the light beams RA to RD entering the second imaging lenses 7A to 7D from the surface vertex in the sub-scanning direction becomes smaller as the absolute value of the curvature radius r of the optical surface becomes larger.

That is, the influence on the change of the optical path of the reflected flare light caused by the change in position of the second imaging lenses 7A to 7D due to the assembling error or the like can be reduced as the absolute value of the curvature radius r of the optical surface of the second imaging lenses 7A to 7D is larger.

However, in order to form images of the light beams RA to RD as spots on the scanned surfaces 8A to 8D, the second imaging lenses 7A to 7D need to have a positive refractive power in the sub-scanning direction. Thus, there is a limit in increasing the curvature radius of the optical surface of the second imaging lenses 7A to 7D.

Thus, adjustment of the curvature radius between the incident surface and the exit surface by bending the incident surface and the exit surface of the second imaging lenses 7A to 7D is effective.

In a case where the sagittal line shape of each optical surface of the second imaging lenses 7A to 7D includes a third-order or fourth-order term of Z (the terms with n=3, 4 in Expression (2)), at least one of the incident surface or the exit surface has a non-arc shape with regard to the sub-scanning direction.

In the case where at least one of the incident surface or the exit surface has the non-arc shape with regard to the sub-scanning direction, the curvature radius at the time when the shape in the sub-scanning section is fitted with the arc is used as the curvature radius of at least one of the incident surface or the exit surface in the sub-scanning section.

As the method of fitting, the least squares method which is generally well known may be used. Further, as the fitting region at this time, a passage range in the sub-scanning direction at the time when the light beams RA to RD pass through at least one of the incident surface or the exit surface may be used.

The inventors of the present invention have found that, even when there is a change in position of the second imaging lenses 7A to 7D due to the assembling error or the like, the influence of the reflected flare light on the imaging optical system arranged on the opposite side can be effectively reduced by designing the absolute value of the curvature radius in the sub-scanning section of the incident surface of the second imaging lenses 7A to 7D to be smaller than the absolute value of the curvature radius in the sub-scanning section of the exit surface.

In the sub-scanning obliquely-incident optical system as in the optical scanning apparatus 100 according to this embodiment, the light beams RA to RD having an angle in the sub-scanning direction enter (obliquely enter) the incident surface of the second imaging lenses 7A to 7D. A magnitude of the angle of oblique incidence is substantially equal to the angle in the sub-scanning direction incident to the reflection surfaces 51 and 52 of the deflector 5 when the first imaging lenses 61 and 62 substantially have scarcely a refractive power in the sub-scanning direction as in this embodiment. That is, in this embodiment, the light beams RA to RD are incident at an angle of 2.7 degrees in the sub-scanning direction with respect to the reflection surfaces 51 and 52 of the deflector 5 as described above.

Meanwhile, the light beams RA to RD are refracted in the sub-scanning direction at the incident surface of the second imaging lenses 7A to 7D, and hence the angle of the light beams RA to RD in the sub-scanning direction entering the exit surface of the second imaging lenses 7A to 7D becomes smaller. Specifically, the angle is 1.2 degrees in this embodiment.

Further, in order to prevent entry of the flare light reflected by the optical surface of the second imaging lenses 7A to 7D into the imaging optical system arranged on the opposite side over the deflector 5, it is also effective to increase the angle of the light beams RA to RD in the sub-scanning direction entering the optical surface of the second imaging lenses 7A to 7D. This is because, as the angle of the light beams RA to RD in the sub-scanning direction entering the optical surface of the second imaging lenses 7A to 7D becomes larger, the angle of reflection of the flare light reflected by the optical surface of the second imaging lenses 7A to 7D also becomes larger. Specifically, this is because, as a result, the optical path of the reflected flare light is significantly separated in the sub-scanning direction from the imaging optical system arranged on the opposite side.

Thus, when the angle in the sub-scanning direction of the light beams RA to RD entering the optical surface of the second imaging lenses 7A to 7D is set larger, the entry of the reflected flare light into the imaging optical system arranged on the opposite side can be prevented even when the angle of reflection of the reflected flare light is changed to some extent by the change in position of the second imaging lenses 7A to 7D due to the assembling error or the like.

Further, as represented by Expression (5), as the absolute value of the curvature radius r in the sub-scanning section of the optical surface becomes smaller, the change of the optical path of the reflected flare light caused by the change in position of the second imaging lenses 7A to 7D due to the assembling error or the like becomes larger.

Further, as described above, the angle in the sub-scanning direction of the light beams RA to RD entering the incident surface of the second imaging lenses 7A to 7D is larger than the angle in the sub-scanning direction of the light beams RA to RD entering the exit surface of the second imaging lenses 7A to 7D.

Thus, the absolute value of the curvature radius r of the incident surface of the second imaging lenses 7A to 7D is set smaller, whereas the absolute value of the curvature radius r of the exit surface of the second imaging lenses 7A to 7D is set larger accordingly. With this, even when there is a change in position of the second imaging lenses 7A to 7D due to the assembling error or the like, the entry of the reflected flare light into the imaging optical system arranged on the opposite side can be prevented.

Specifically, the curvature radius r of the optical surface of the second imaging lenses 7A to 7D is set so that an absolute value $|\Delta\theta|$ of a change in angle of reflection of the reflected flare light along with the change in position of the second imaging lenses 7A to 7D due to the assembling error or the like becomes smaller than an absolute value $|\beta|$ of the angle of oblique incidence of the light beam in the sub-scanning direction to the reflection surfaces 51 and 52 of the deflector 5. With this, the entry of the reflected flare light into the imaging optical system arranged on the opposite side over the deflector 5 can be prevented.

In other words, this corresponds to maintaining the substantial angle of the light beam entering the incident surface of the second imaging lenses 7A to 7D to be larger than 0 degrees taking into consideration the assembling error or the like of the second imaging lenses 7A to 7D.

That is, the optical scanning apparatus 100 according to this embodiment is preferred to satisfy Expression (6).

$$|\Delta\theta| < |\beta| \tag{6}$$

Typically, the change $\Delta z$ in the height of incidence of the light beams RA to RD entering the second imaging lenses 7A to 7D in the sub-scanning direction from the surface vertex due to the assembling error or the like of the second imaging lenses 7A to 7D is about 0.7 mm at most.

Thus, an absolute value Rz of the curvature radius in the sub-scanning section of the incident surfaces of the second imaging lenses 7A to 7D is preferred to satisfy Expression (7) rather than Expression (5) and Expression (6).

$$R_z > \frac{360}{\pi} \frac{0.7}{|\beta|} \tag{7}$$

In the optical scanning apparatus 100 according to this embodiment, as shown in Table 1, the curvature radius in the sub-scanning section of the incident surface of the imaging lenses 7A to 7D is 40 mm, and the curvature radius in the sub-scanning section of the exit surfaces is −122.3 mm.

Thus, the optical scanning apparatus 100 according to this embodiment is designed so that the absolute value of the curvature radius in the sub-scanning section of the incident surface of the second imaging lenses 7A to 7D becomes smaller than the absolute value of the curvature radius in the sub-scanning section of the exit surface.

Further, when the values described above are substituted to Expression (7), the left side of Expression (7) becomes Rz=40, and the right side becomes (360×0.7)/(π×2.7)= 29.71, and hence it can be seen that the optical scanning apparatus 100 according to this embodiment satisfies Expression (7).

From the description above, in the optical scanning apparatus 100 according to this embodiment, even when the position is changed due to the assembling error or the like of the second imaging lenses 7A to 7D, the entry of the flare light reflected by the second imaging lenses 7A to 7D into the imaging optical system arranged on the opposite side over the deflector 5 can be prevented.

As described above, in the case where the first imaging lenses 61 and 62 substantially have scarcely a refractive power in the sub-scanning direction, the angle in the sub-scanning direction of the light beams RA to RD entering the incident surface of the second imaging lenses 7A to 7D is substantially equal to a light beam oblique incident angle β in the sub-scanning direction with respect to the reflection surfaces 51 and 52 of the deflector 5.

However, in the case where the first imaging lenses 61 and 62 have the refractive power in the sub-scanning direction, the angle in the sub-scanning direction of the light beams RA to RD entering the incident surface of the second imaging lenses 7A to 7D does not generally match with the angle 3.

In the case where the first imaging lenses 61 and have a negative refractive power in the sub-scanning direction, the angle in the sub-scanning direction of the light beams RA to RD entering the incident surface of the second imaging lenses 7A to 7D becomes larger than the angle β. Therefore, it is only necessary that the absolute value Rz of the curvature radius in the sub-scanning section of the incident surface of the second imaging lenses 7A to 7D satisfy Expression (7).

However, when the first imaging lenses 61 and 62 are designed so as to have a large negative refractive power, the positive refractive power of the second imaging lenses 7A to 7D needs to be set larger. When the positive refractive power of the second imaging lenses 7A to 7D becomes excessively larger, the degradation of the optical performance becomes more conspicuous along with the change in position of the second imaging lenses 7A to 7D due to the assembling error or the like.

Thus, in the case where the first imaging lenses 61 and 62 are designed so as to have a negative refractive power in order to reduce the lateral magnification in the sub-scanning direction of the imaging optical system, the absolute value of the negative refractive power thereof is generally set to be a half of or less than a half of the absolute value of the refractive power of the second imaging lenses 7A to 7D in the sub-scanning direction. Thus, also in this case, it is only necessary that Rz satisfy Expression (7).

Meanwhile, in the case where the first imaging lenses 61 and 62 have a positive refractive power in the sub-scanning direction, the angle in the sub-scanning direction of the light beams RA to RD entering the incident surface of the second imaging lenses 7A to 7D becomes smaller than the angle β. However, in this case, the lateral magnification in the sub-scanning direction of the imaging optical system becomes larger. When the lateral magnification in the sub-scanning direction of the imaging optical system becomes larger, and there is a displacement of the light beam entering the imaging optical system due to the assembling error or the like of the optical element, the degradation of the optical performance becomes more conspicuous.

Thus, in the case where the first imaging lenses 61 and 62 are designed so as to have the positive refractive power, the absolute value of the positive refractive power is typically set to be equal to or less than the absolute value of the refractive power of the second imaging lenses 7A to 7D in the sub-scanning direction. Therefore, also in this case, it is only necessary that Rz satisfy Expression (7).

A relationship between the absolute value of the refractive power of the first imaging lenses 61 and 62 and the absolute value of the refractive power of the second imaging lenses 7A to 7D in the sub-scanning direction differs in the case where the first imaging lenses 61 and 62 have the positive refractive power and in the case where the first imaging lenses 61 and 62 have the negative refractive power as described above. This is because the refractive power of the second imaging lenses 7A to 7D can be set relatively smaller when the first imaging lenses 61 and 62 have the positive refractive power.

Figure 6A:
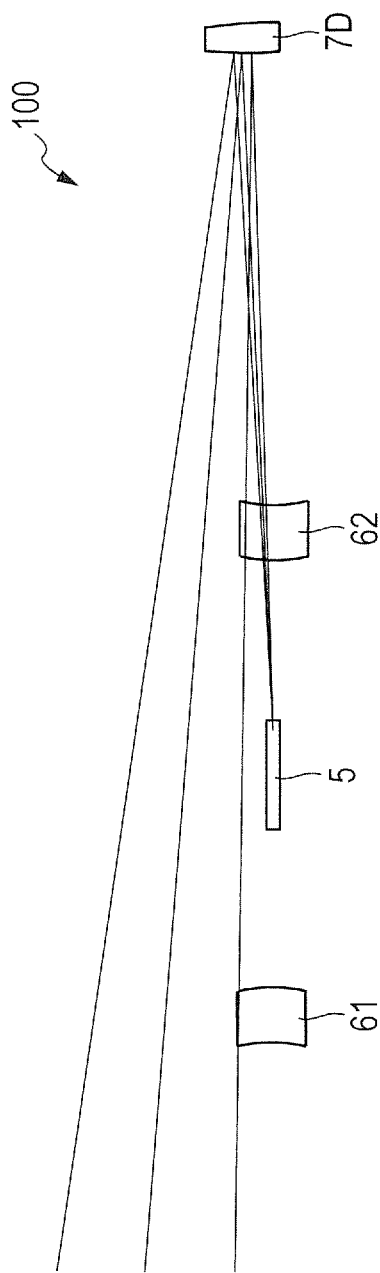
FIG. 6A is a sub-scanning sectional view of a part of the imaging optical system of the optical scanning apparatus according to the first embodiment when the second imaging lens is shifted downward in the sub-scanning direction by 0.7 mm.
Figure 6B:
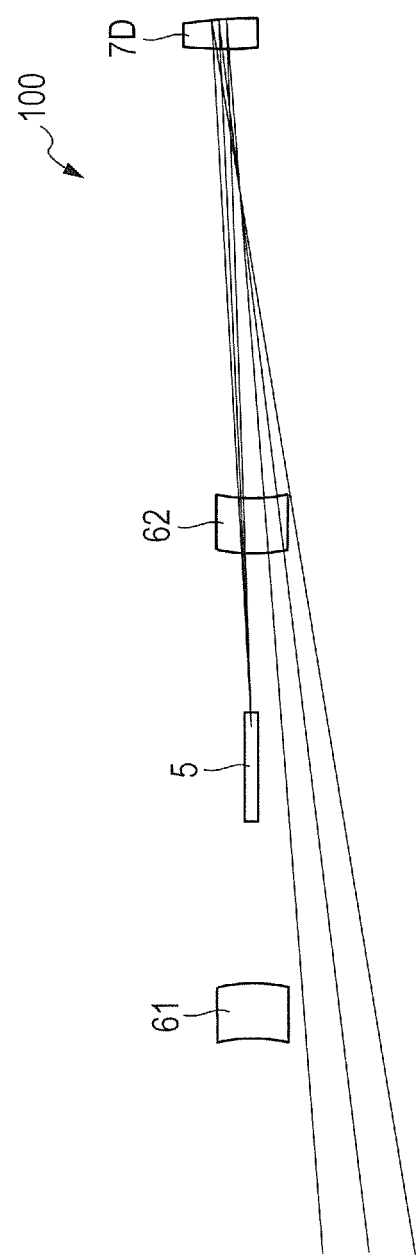
FIG. 6B is a sub-scanning sectional view of a part of the imaging optical system of the optical scanning apparatus according to the first embodiment when the second imaging lens is shifted downward in the sub-scanning direction by 0.7 mm.

FIG. 6A and FIG. 6B are sub-scanning sectional views for illustrating a part of the imaging optical system of the optical scanning apparatus 100 according to the first embodiment when the second imaging lens 7D is shifted downward in the sub-scanning direction by 0.7 mm.

As can be seen in FIG. 6A and FIG. 6B, even when the imaging lens 7D is shifted downward in the sub-scanning direction due to the assembling error or the like, the flare light reflected by the imaging lens 7D is prevented from entering the imaging optical system arranged on the opposite side over the deflector 5.

As described above, in this embodiment, the second imaging lenses 7A to 7D are designed so that the absolute value of the curvature radius in the sub-scanning section of the incident surface of the second imaging lenses 7A to 7D becomes smaller than the absolute value of the curvature radius in the sub-scanning section of the exit surface. In that case, as a result, the incident surface of the second imaging lenses 7A to 7D is convex toward the deflector 5 with regard to the sub-scanning direction. This is because the second imaging lenses 7A to 7D have the positive refractive power in the sub-scanning direction.

Thus, the incident surface of the second imaging lenses 7A to 7D has the positive refractive power in the sub-scanning direction, and hence the angle in the sub-scanning direction of the light beams RA to RD entering the exit surface of the second imaging lenses 7A to 7D becomes smaller than the angle of the light beams RA to RD entering the incident surface.

Further, the angle in the sub-scanning direction of the light beams RA to RD entering the incident surfaces of the second imaging lenses 7A to 7D is determined depending on the configuration of each optical element arranged on the light source side of the second imaging lens 7D. Thus, the angle in the sub-scanning direction of the light beams RA to RD entering the incident surface of the second imaging lenses 7A to 7D is not dependent on the relationship in the refractive power of the incident surface and the exit surface of the second imaging lenses 7A to 7D.

Thus, the absolute value of the curvature radius of the incident surface of the second imaging lenses 7A to 7D is set to be smaller than the absolute value of the curvature radius of the exit surface, thereby being capable of reducing the influence of the reflected flare light on the imaging optical system arranged on the opposite side even when there is a change in position of the second imaging lenses 7A to 7D due to the assembling error or the like.

Now, there is considered a case where the absolute value of the curvature radius of the incident surfaces of the second imaging lenses 7A to 7D is larger than the absolute value of the curvature radius of the exit surface, as is different from this embodiment. In this case, the second imaging lenses 7A to 7D are biconvex lenses or planoconvex lenses, or meniscus lenses having a concave surface oriented toward the deflector 5.

In the case where the second imaging lenses 7A to 7D are the biconvex lenses or the planoconvex lenses, the refractive power in the sub-scanning direction of the incident surface of the second imaging lenses 7A to 7D is zero or positive, and the absolute value of the refractive power becomes smaller than that of this embodiment.

The angle in the sub-scanning direction of the light beams RA to RD entering the exit surface of the second imaging lenses 7A to 7D becomes equal to or less than the angle in the sub-scanning direction of the light beams RA to RD entering the incident surface.

Thus, in the case where the second imaging lenses 7A to 7D are biconvex lenses or planoconvex lenses in which the absolute value of the curvature radius of the incident surface is larger than the absolute value of the curvature radius of the exit surface, a significant margin for an allowable change of the optical path of the reflected flare light due to the assembling error or the like is left with regard to the incident surface.

Meanwhile, with regard to the exit surface, even though an allowable change of the optical path of the reflected flare light due to the assembling error or the like is reduced, the absolute value of the curvature radius of the exit surface is set to be small. Therefore, as a result, there is a risk in that the influence of the reflected flare light on the imaging optical system arranged on the opposite side caused by the change in position of the second imaging lenses 7A to 7D due to the assembling error or the like is liable to be conspicuous.

Meanwhile, in the case where the second imaging lenses 7A to 7D are meniscus lenses having a concave surface oriented toward the deflector 5, the incident surface of the second imaging lenses 7A to 7D has a negative refractive power with regard to the sub-scanning direction. Thus, the angle in the sub-scanning direction of the light beams RA to RD entering the exit surface of the second imaging lenses 7A to 7D becomes larger than the angle in the sub-scanning direction of the light beams RA to RD entering the incident surface.

Further, in order to allow the second imaging lenses 7A to 7D to have the positive refractive power, the positive refractive power of the exit surface of the second imaging lenses 7A to 7D needs to be set larger as compared to the case where the second imaging lenses 7A to 7D are biconvex lenses. This means that the absolute value of the curvature radius in the sub-scanning section of the exit surface of the second imaging lenses 7A to 7D needs to be set smaller.

As represented by Expression (5), a change in angle of reflection of the flare light reflected by the second imaging lenses 7A to 7D caused by the change in position of the second imaging lenses 7A to 7D due to the assembling error or the like is inversely proportional to the curvature radius of the optical surface in the sub-scanning section. That is, the change in angle of reflection of the reflected flare light becomes significantly larger as the absolute value of the curvature radius in the sub-scanning section becomes smaller.

Thus, in the case where the second imaging lenses 7A to 7D are meniscus lenses having a concave surface oriented toward the deflector 5, the absolute value of the curvature radius in the sub-scanning section of the exit surface of the second imaging lenses 7A to 7D becomes excessively smaller. Therefore, there is a risk in that the influence of the reflected flare light on the imaging optical system arranged on the opposite side caused by the change in position of the second imaging lenses 7A to 7D due to the assembling error or the like is liable to be conspicuous.

From the description above, in order to effectively reduce the influence of the reflected flare light on the imaging optical system arranged on the opposite side even when there is a change in position of the second imaging lenses 7A to 7D due to the assembling error or the like, it is preferred that, as in this embodiment, the absolute value of the curvature radius in the sub-scanning section of the incident surface of the second imaging lenses 7A to 7D be set smaller than the absolute value of the curvature radius in the sub-scanning section of the exit surface.

As described above, the optical scanning apparatus 100 according to this embodiment includes two imaging optical systems arranged over the deflector 5 (two-side scanning optical system). The second imaging lenses 7A to 7D are designed so that, in one imaging optical system, an absolute value of the curvature radius in the sub-scanning section of the incident surface of the second imaging lenses 7A to 7D (at least one optical element) is set smaller than an absolute value of the curvature radius in the sub-scanning section of the exit surface. With this, even when there is a change in position of the second imaging lenses 7A to 7D due to the assembling error or the like, the influence of the flare light reflected by the optical surface of the second imaging lenses 7A to 7D on another imaging optical system arranged on the opposite side can be reduced.

Further, the second imaging lenses 7A to 7D are designed so that the absolute value Rz of the curvature radius in the sub-scanning section of the incident surface of the second imaging lenses 7A to 7D satisfies Expression (7) with regard to the light beam oblique incident angle $\beta$ in the sub-scanning direction with respect to the reflection surfaces 51 and 52 of the deflector 5. With this, the change of the optical path of the flare light reflected by the second imaging lenses 7A to 7D caused by the change in position of the second imaging lenses 7A to 7D due to the assembling error or the like can be suppressed within the allowable range.

In the above, the present invention is described with the first embodiment described above. However, the present invention is not limited to the first embodiment and can be modified in various ways.

For example, the optical scanning apparatus 100 according to the first embodiment has a configuration in which the four scanned surfaces 8A to 8D are scanned with the single deflector 5. However, the optical scanning apparatus of the present invention is only necessary to arrange two imaging optical systems on both sides of the deflector and may have a configuration of scanning two or three scanned surfaces.

Further, the optical scanning apparatus of the present invention does not need to have the six imaging lenses and may have a configuration of including two or four imaging lenses. In such a case, the configuration of the present invention may be applied to at least one of the incident surface or the exit surface of the imaging lens for which the influence of the flare light reflected by the optical surface is to be considered.

Further, the optical scanning apparatus 100 according to the first embodiment has a configuration including individual second imaging lenses 7A to 7D. However, there may be employed a multi-stage lens including lenses integrally coupled to each other in the sub-scanning direction so as to allow the second imaging lenses to have optical surfaces being different in the upper and lower sides in the sub-scanning direction.

Further, the light beam oblique incident angle $\beta$ in the sub-scanning direction with respect to the reflection surfaces 51 and 52 of the deflector 5 can also be modified as needed. For example, in the optical scanning apparatus 100 according to the first embodiment, the angle $\beta$ is 2.7 degrees. However, the angle $\beta$ is not limited to this value, and it is only necessary that the angle $\beta$ be 2 degrees or more.

Second Embodiment

Figure 7A:
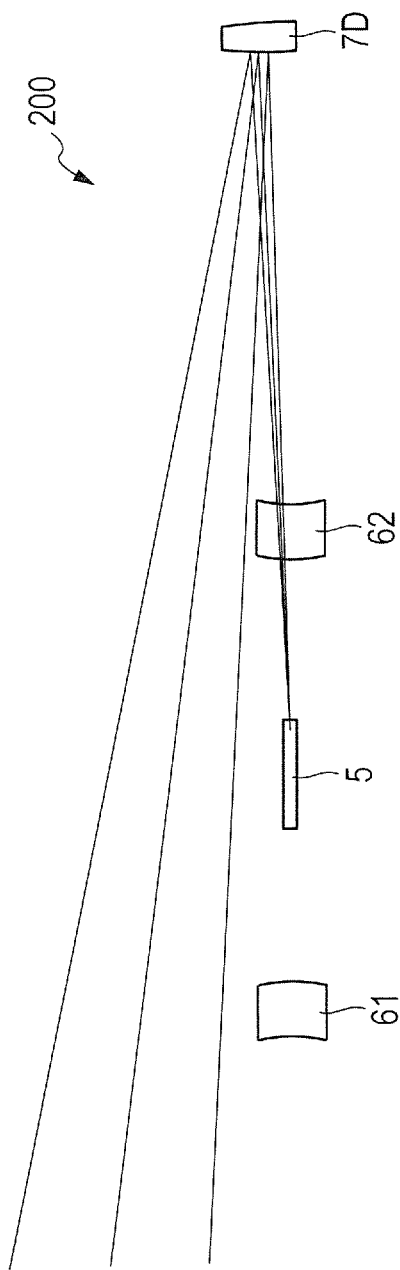
FIG. 7A is a sub-scanning sectional view of a part of an imaging optical system of an optical scanning apparatus according to a second embodiment of the present invention.
Figure 7B:
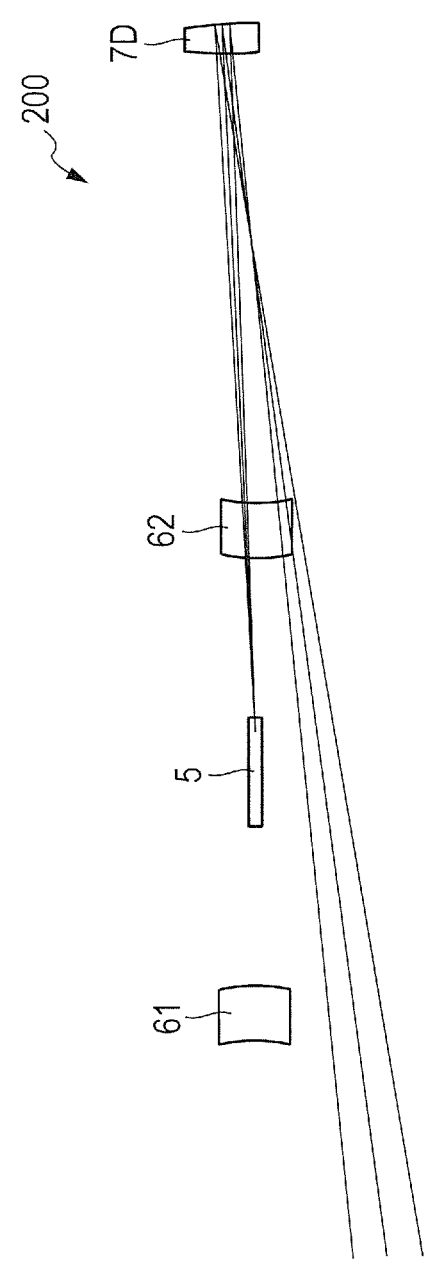
FIG. 7B is a sub-scanning sectional view of a part of the imaging optical system of the optical scanning apparatus according to the second embodiment.

FIG. 7A and FIG. 7B are sub-scanning sectional views for illustrating a part of an imaging optical system of an optical scanning apparatus 200 according to a second embodiment of the present invention.

With regard to the optical scanning apparatus 200 according to the second embodiment, components which are the same as those of the first embodiment are denoted by the same reference symbols.

Various characteristics of each optical system included in the optical scanning apparatus 200 according to the second embodiment are shown in Table 2. Here, "E±x" represents "$10^{\pm x}$". Further, coefficients which are not particularly described are all zero.

TABLE 2

| Configuration of Incident Optical System/Arrangement of Imaging Optical System | | | Surface Data of Imaging Optical System Lens | | | | |
|---|---|---|---|---|---|---|---|
| | | | | First Imaging Lenses 61 and 62 | | Second Imaging Lenses 7A to 7D | |
| | | | | Incident Surface | Exit Surface | Incident Surface | Exit Surface |
| Light Source Wavelength | λ(nm) | 790 | R | −5.23531E+01 | −3.54848E+01 | −4.00000E+03 | 3.62514E+02 |
| | | | K | −5.06134E+00 | −9.93004E−01 | 0.00000E+00 | −9.31333E+01 |
| Number of Light Emission Points | n | 2 | B2 | 0.00000E+00 | 0.00000E+00 | 0.00000E+00 | 0.00000E+00 |
| Thickness of Laser Cover Glass | d0(mm) | 0.25000 | Meridional Line | | | | |
| Refractive Index of Laser Cover Glass | n0 | 1.51052 | | | | | |
| Light Emission Point of Light Source 1 to First Surface of Collimator Lens 2 | d0(mm) | 23.32740 | B4 | 6.71632E−07 | 1.61528E−06 | 0.00000E+00 | −2.60040E−07 |
| Curvature Radius of First Surface of Collimator Lens 2 | R1(mm) | ∞ | B6 | 3.42665E−09 | 2.24483E−09 | 0.00000E+00 | 2.89365E−11 |
| Curvature Radius of Second Surface of Collimator Lens 2 | R2(mm) | −19.04573 | B8 | −4.41970E−12 | −7.80639E−13 | 0.00000E+00 | −2.27086E−15 |
| Thickness of Collimator Lens 2 | d1(mm) | 3.00000 | B10 | 1.89638E−15 | −2.89472E−16 | 0.00000E+00 | 8.11097E−20 |
| Refractive Index of Collimator Lens 2 | n1 | 1.76167 | B12 | 0.00000E+00 | 0.00000E+00 | 0.00000E+00 | 0.00000E+00 |
| Second Surface of Collimator Lens 2 to First Surface of Cylindrical Lens 3 | d2(mm) | 9.25297 | r | 2.00000E+01 | 1.70000E+01 | 3.50000E+01 | −2.11214E+02 |
| Curvature Radius of First Surface of Cylindrical Lens 3 in Sub-scanning Direction | Rs3(mm) | 77.27361 | Sagittal Line | | | | |
| Curvature Radius of First Surface of Cylindrical Lens 3 in Main Scanning Direction | Rm3(mm) | ∞ | k | 0.00000E+00 | 0.00000E+00 | 0.00000E+00 | 0.00000E+00 |
| Curvature Radius of Second Surface of Cylindrical Lens 3 in Sub-scanning Direction | Rs4(mm) | ∞ | D2u | 0.00000E+00 | −8.48558E−05 | 6.62479E−05 | 2.39605E−04 |
| Curvature Radius of Second Surface of Cylindrical Lens 3 in Main Scanning Direction | Rm4(mm) | ∞ | D4u | 0.00000E+00 | −4.04119E−07 | 0.00000E+00 | −5.30523E−08 |
| Thickness of Cylindrical Lens 3 | d3(mm) | 3.00000 | D6u | 0.00000E+00 | 1.45046E−09 | 0.00000E+00 | 1.23558E−11 |
| Refractive Index of Cylindrical Lens 3 | n2 | 1.52397 | D8u | 0.00000E+00 | −1.11422E−12 | 0.00000E+00 | −2.23885E−15 |
| Second Surface of Cylindrical Lens 3 to Sub-scanning Stop 41 | d4(mm) | 5.00000 | D10u | 0.00000E+00 | 2.09529E−16 | 0.00000E+00 | 1.51176E−19 |
| Sub-scanning Stop 41 to Main Scanning Stop 42 | d5(mm) | 92.41963 | D12u | 0.00000E+00 | 0.00000E+00 | 0.00000E+00 | 0.00000E+00 |
| Main Scanning Stop 42 to Axial Deflection/Reflection Surfaces 51 and 52 | d6(mm) | 50.00000 | D14u | 0.00000E+00 | 0.00000E+00 | 0.00000E+00 | 0.00000E+00 |
| Axial Deflection/Reflection Surfaces 51 and 52 to Incident Surfaces of First Imaging Lenses 61 and 62 | d7(mm) | 26.00000 | D2l | 0.00000E+00 | −1.66229E−04 | 6.62479E−05 | 2.23303E−04 |
| Thickness of First Imaging Lenses 61 and 62 | d8(mm) | 7.80000 | D4l | 0.00000E+00 | −4.18851E−07 | 0.00000E+00 | −6.08377E−08 |
| Refractive Index of First Imaging Lenses 61 and 62 | n3 | 1.52397 | D6l | 0.00000E+00 | 1.47415E−09 | 0.00000E+00 | 1.49563E−11 |
| Exit Surfaces of First Imaging Lenses 61 and 62 to Incident Surfaces of Second Imaging Lenses 7A to 7D | d9(mm) | 69.20000 | D8l | 0.00000E+00 | −4.88709E−13 | 0.00000E+00 | −2.53121E−15 |
| Thickness of Second Imaging lenses 7A to 7D | d10(mm) | 4.40000 | D10l | 0.00000E+00 | −5.15515E−16 | 0.00000E+00 | 1.62518E−19 |
| Refractive Index of Second Imaging Lenses 7A to 7D | n4 | 1.52397 | D12l | 0.00000E+00 | 0.00000E+00 | 0.00000E+00 | 0.00000E+00 |
| Exit Surfaces of Second Imaging Lenses 7A to 7D to Incident Surfaces of Dust-proof Glasses 9A to 9D | d11(mm) | 47.50000 | D14l | 0.00000E+00 | 0.00000E+00 | 0.00000E+00 | 0.00000E+00 |
| Thickness of Dust-proof Glasses 9A to 9D | d12(mm) | 1.80000 | G0, 1 | | | 3.82000E−02 | −4.83677E−02 |
| Refractive Index of Dust-proof Glasses 9A to 9D | n5 | 1.51052 | G1, 1 | | | −8.87039E−05 | −8.46500E−05 |
| Exit Surfaces of Dust-proof Glasses 9A to 9D to Scanned Surfaces 8A to 8D | d13(mm) | 96.30000 | G2, 1 | | | 8.54722E−06 | 1.64407E−05 |

TABLE 2-continued

| Configuration of Incident Optical System/Arrangement of Imaging Optical System | | | Surface Data of Imaging Optical System Lens | | | | |
|---|---|---|---|---|---|---|---|
| | | | First Imaging Lenses 61 and 62 | | Second Imaging Lenses 7A to 7D | | |
| Light Source Wavelength | λ(nm) | 790 | | Incident Surface | Exit Surface | Incident Surface | Exit Surface |
| Number of Light Emission Points | n | 2 | | | | | |
| Incident Angle of Deflector 5 of Incident Optical System in Main Scanning Direction | α(deg) | 75.00000 | G3, 1 | | | −3.57291E−08 | −2.56727E−08 |
| Incident Angle of Deflector 5 of Incident Optical System in Sub-scanning Direction | β(deg) | 2.50000 | G4, 1 | | | 2.26355E−09 | −1.69096E−10 |
| Effective Scanning Angle | γ(deg) | ±40.2619 | G5, 1 | | | 8.07315E−12 | 3.56633E−12 |
| Effective Scanning Width | Ym(mm) | ±156 | G6, 1 | | | −6.01981E−13 | 8.52994E−14 |
| Number of Surfaces of Deflector 5 | men | 4 | G7, 1 | | | −1.90413E−16 | 3.50000E−16 |
| Circumscribed Circle Radius of Deflector 5 | Rpol(mm) | 10.00000 | G8, 1 | | | 1.54096E−17 | −6.18518E−17 |
| Center Position of Deflector 5 (Optical Axis Direction in Imaging Optical System) | PX(mm) | −5.89500 | G9, 1 | | | −3.31755E−20 | −5.09558E−20 |
| Center Position of Deflector 5 (Deflection Scanning Direction) | PY(mm) | 3.93300 | G10, 1 | | | 1.83111E−21 | 4.65582E−21 |
| Aperture Stop Diameter (Main Scanning Stop 42 × Sub-scanning Stop 41) | Rectangle (mm) | 4.00 × 3.00 | G11, 1 | | | 0.00000E+00 | 0.00000E+00 |
| | | | G12, 1 | | | 0.00000E+00 | 0.00000E+00 |

* The refractive index is a refractive index with respect to a wavelength of 790 nm.

Expressions for each optical member included in the optical scanning apparatus 200 according to the second embodiment are the same as those of the first embodiment.

Further, with regard to the change coefficients $D_1$ to $D_{14}$ of the sagittal line curvature radius r', when the coefficients are different on a positive side in the main scanning direction Y (away from light source side, upper side in FIG. 1) and on a negative side (light source side, lower side in FIG. 1), a suffix "u" is given to the coefficient on the positive side, and a suffix "l" is given to the coefficient on the negative side.

In the optical scanning apparatus 200 according to this embodiment, the second imaging lenses 7A to 7D are arranged so as to be eccentric by 4.8 mm in the sub-scanning direction.

As shown in Table 2, a curvature radius in the sub-scanning section of the incident surface of the second imaging lenses 7A to 7D of this embodiment is 35 mm, and a curvature radius in the sub-scanning section of the exit surface is −211.2 mm.

Thus, also in this embodiment, the second imaging lenses 7A to 7D are designed so that the absolute value of the curvature radius in the sub-scanning section of the incident surface of the second imaging lenses 7A to 7D becomes smaller than the absolute value of the curvature radius in the sub-scanning section of the exit surface.

Further, in the optical scanning apparatus 200 according to this embodiment, the light beam oblique incident angle in the sub-scanning direction with respect to the reflection surfaces 51 and 52 of the deflector 5 is 2.5 degrees.

Thus, when the values described above are substituted into Expression (7), the left side of Expression (7) becomes Rz=35, and the right side becomes (360×0.7)/(π×2.5)=32.1. Thus, it can be seen that the optical scanning apparatus 200 according to this embodiment satisfies Expression (7).

From the description above, also in the optical scanning apparatus 200 according to this embodiment, as in the first embodiment, the influence of the flare light reflected at the optical surface of the second imaging lenses 7A to 7D on the imaging optical system arranged on the opposite side can be effectively reduced even when there is a change in position of the second imaging lenses 7A to 7D due to the assembling error or the like.

Figure 8A:
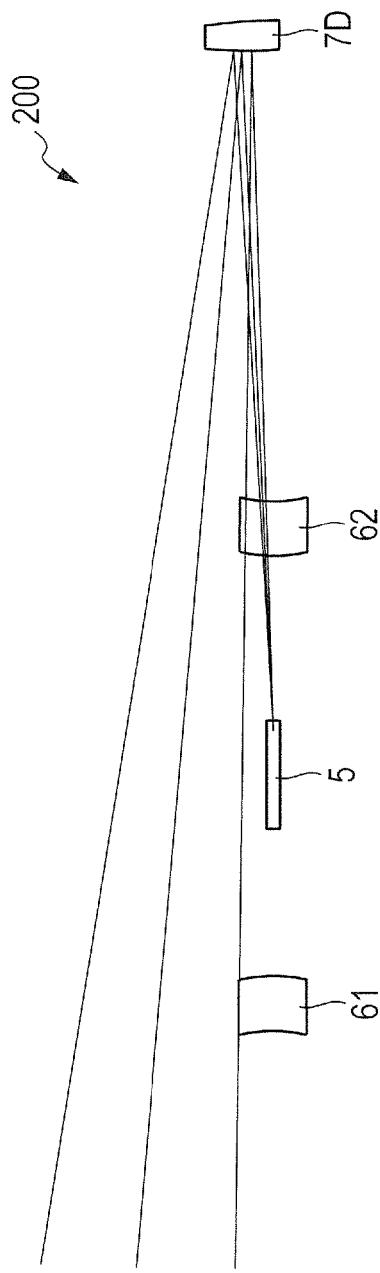
FIG. 8A is a sub-scanning sectional view of a part of the imaging optical system of the optical scanning apparatus according to the second embodiment when the second imaging lens is shifted downward in the sub-scanning direction by 0.7 mm.
Figure 8B:
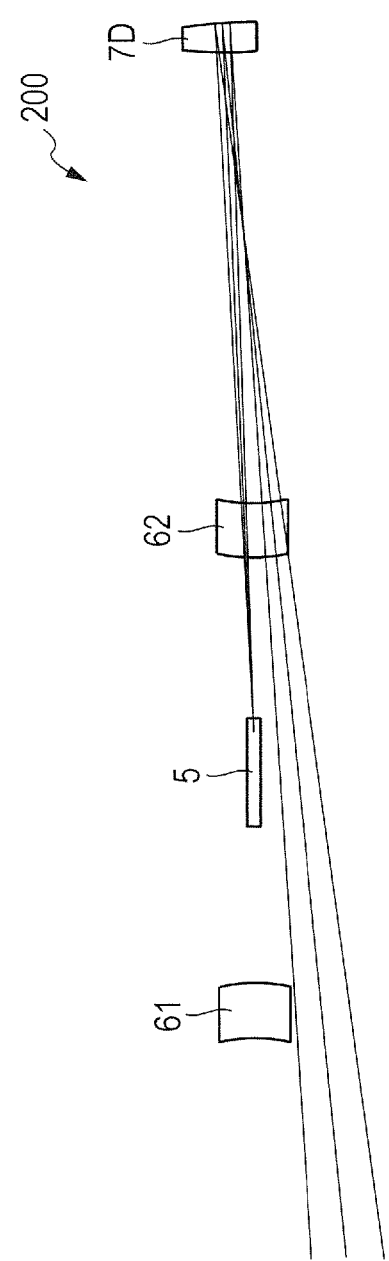
FIG. 8B is a sub-scanning sectional view of a part of the imaging optical system of the optical scanning apparatus according to the second embodiment when the second imaging lens is shifted downward in the sub-scanning direction by 0.7 mm.

FIG. 8A and FIG. 8B are sub-scanning sectional views for illustrating a part of the imaging optical system of the optical scanning apparatus 200 according to the second embodiment when the second imaging lens 7D is shifted downward in the sub-scanning direction by 0.7 mm.

As can be seen in FIG. 8A and FIG. 8B, even when the imaging lens 7D is shifted downward in the sub-scanning direction due to the assembling error or the like, the flare light reflected by the imaging lens 7D is prevented from entering the imaging optical system arranged on the opposite side over the deflector 5.

Further, as can be seen in Table 2, tilt angles of the incident surface and the exit surface of the second imaging lenses 7A to 7D in the sub-scanning direction on the optical axis are 2.2 degrees and −2.8 degrees, respectively.

Thus, also in the second embodiment, the relative difference in the tilt angles of the incident surface and the exit surface of the second imaging lenses 7A to 7D in the sub-scanning direction on the optical axis is 6 degrees or less, and an absolute value of the tilt angles of the incident surface and the exit surface of the second imaging lenses 7A to 7D in the sub-scanning direction on the optical axis is 8 degrees or less.

Figure 9:
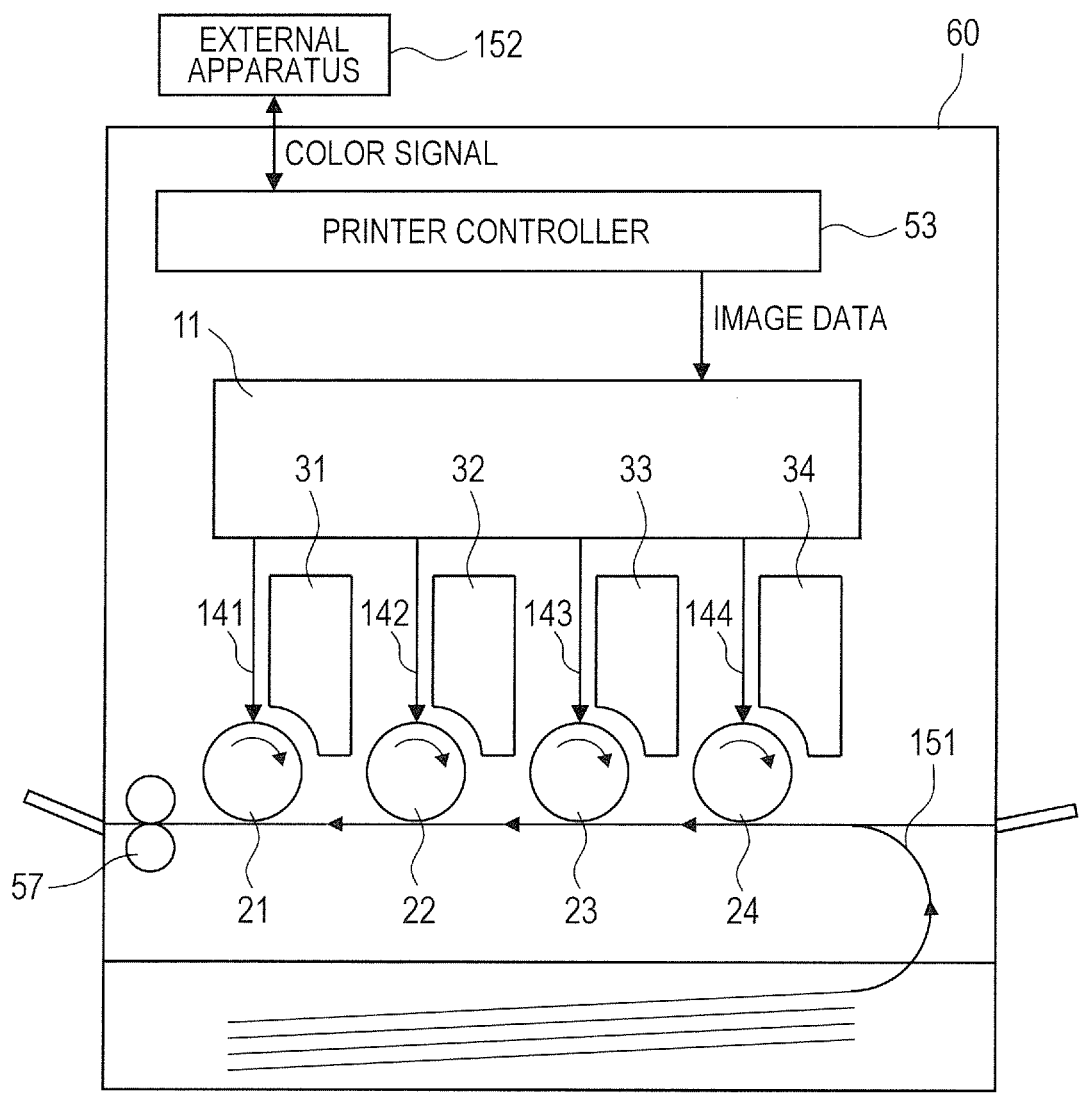
FIG. 9 is a sub-scanning sectional view for schematically illustrating relevant parts of a color image forming apparatus including the optical scanning apparatus according to the embodiments of the present invention.

FIG. 9 is a schematic sub-scanning sectional view for illustrating relevant parts of a color image forming apparatus 60 including the optical scanning apparatus according to the embodiments of the present invention.

The color imaging apparatus 60 includes an optical scanning apparatus 11, photosensitive drums 21, 22, 23, and 24 serving as image bearing bodies (photosensitive bodies), developing units 31, 32, 33, and 34, and a conveyance belt 151.

The color image forming apparatus 60 receives signals of respective colors including R (red), G (green), and B (blue) from an external apparatus 152, such as a personal computer. Those color signals are input as pieces of input code data and converted by a printer controller 53 in the apparatus into pieces of image data (dot data) for Y (yellow), M (magenta), C (cyan), and K (black). Those pieces of image data are input to the optical scanning apparatus 11.

Then, light beams 141, 142, 143, and 144 modulated in accordance with the respective pieces of image data are emitted from the optical scanning apparatus 11, and photosensitive surfaces of the photosensitive drums 21 to 24 are scanned with those light beams in the main scanning direction.

In the color image forming apparatus 60, the optical scanning apparatus 11 performs scanning by four beams, and the beams correspond to the colors of Y (yellow), M (magenta), C (cyan), and K (black), respectively. Electrostatic latent images corresponding to the image signals (image information) are formed with the beams on photosensitive surfaces of the photosensitive drums 21 to arranged in parallel, respectively. The formed electrostatic latent images are developed by the developing units 31 to 34, respectively, to thereby form toner images. After that, the toner images are superposed and transferred onto a recording material, which is a transferred material, by a transferring unit (not shown), and the superposed and transferred toner images are fixed on the transferred material by the fixing unit 57, thereby forming one full-color image on the recording material.

As the external apparatus 152, for example, there may be used a color image reading device including a CCD sensor. In this case, the color image reading device and the color image forming apparatus 60 construct a color digital copying machine.

In the color image forming apparatus 60, the four photosensitive drums 21 to 24 are scanned with the single optical scanning apparatus 11. However, there may be employed a configuration in which two photosensitive drums are scanned with each of the two optical scanning apparatus according to the embodiments of the present invention.

According to the present invention, even when there is a change in position of the first optical element of the first imaging optical system due to the assembling error or the like, entry of the flare light reflected by the first optical element into the second imaging optical system can be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-218575, filed Nov. 6, 2015, which is hereby incorporated by reference herein in its entirety.

What is claimed is:

1. An optical scanning apparatus, comprising:
a deflector configured to deflect light beams with first and second deflection surfaces to scan first and second scanned surfaces in a main scanning direction;
first and second imaging optical systems configured to guide the light beams deflected by the first and second deflection surfaces to the first and second scanned surfaces; and
an incident optical system configured to allow the light beam to obliquely enter the first deflection surface in a sub-scanning section,
wherein the first imaging optical system comprises a first optical element having an absolute value of a curvature radius of an incident surface smaller than an absolute value of a curvature radius of an exit surface in the sub-scanning section including an optical axis, and
wherein the incident surface of the first optical element is configured to reflect the light beam entering the incident surface toward a direction of separating from a main scanning section including the deflector in the sub-scanning section including the optical axis.

2. An optical scanning apparatus according to claim 1, wherein the incident surface and the exit surface of the first optical element have a positive refractive power in the sub-scanning section.

3. An optical scanning apparatus according to claim 1, wherein, in the sub-scanning section, the following condition is satisfied:

$$R_z > \frac{360}{\pi} \frac{0.7}{|\beta|},$$

where $\beta$ represents an incident angle of the light beam with respect to the first reflection surface, and $R_z$ represents an absolute value of a curvature radius of the incident surface of the first optical element.

4. An optical scanning apparatus according to claim 1, wherein an absolute value of an incident angle of a light beam with respect to the first deflection surface in the sub-scanning section is 2 degrees or more.

5. An optical scanning apparatus according to claim 1, wherein, in the sub-scanning section including the optical axis, the incident surface of the first optical element is tilted so as to reflect a light beam entering the incident surface toward a direction of separating from the main scanning section including the deflector.

6. An optical scanning apparatus according to claim 1, wherein the incident surface and the exit surface of the first optical element comprise surfaces in which tilt angles in the sub-scanning section are changed in the main scanning direction.

7. An optical scanning apparatus according to claim 1, wherein an absolute value of a tilt angle of the incident surface and the exit surface of the first optical element in the sub-scanning section including the optical axis is 8 degrees or less.

8. An optical scanning apparatus according to claim 1, wherein an absolute value of a difference between a tilt angle of the incident surface and a tilt angle of the exit surface of the first optical element in the sub-scanning section including the optical axis is 6 degrees or less.

9. An optical scanning apparatus according to claim 1, wherein the first optical element is arranged at a position closest to the first scanned surface on an optical path among optical elements included in the first imaging optical system.

10. An optical scanning apparatus according to claim 1, wherein the first optical element is made of plastic.

11. An optical scanning apparatus, comprising:
a deflector configured to deflect light beams with first and second deflection surfaces to scan first and second scanned surfaces in a main scanning direction;
first and second imaging optical systems configured to guide the light beams deflected by the first and second deflection surfaces to the first and second scanned surfaces; and
an incident optical system configured to allow the light beam to obliquely enter the first deflection surface in a sub-scanning section,
wherein the first imaging optical system comprises a first optical element having an absolute value of a curvature radius of an incident surface smaller than an absolute value of a curvature radius of an exit surface in the sub-scanning section including an optical axis, and
wherein the incident surface and the exit surface of the first optical element have a positive refractive power in the sub-scanning section.

12. An image forming apparatus, comprising:
an optical scanning apparatus;
a developing unit configured to develop electrostatic images, which are formed on first and second scanned surfaces by the optical scanning apparatus, as toner images;
a transferring unit configured to transfer the developed toner images onto a transferred material; and
a fixing unit configured to fix the transferred toner images on the transferred material,
the optical scanning apparatus comprising:
a deflector configured to deflect light beams with first and second deflection surfaces to scan the first and second scanned surfaces in a main scanning direction;
first and second imaging optical systems configured to guide the light beams deflected by the first and second deflection surfaces to the first and second scanned surfaces; and
an incident optical system configured to allow the light beam to obliquely enter the first deflection surface in a sub-scanning section,
wherein the first imaging optical system comprises a first optical element having an absolute value of a curvature radius of an incident surface smaller than an absolute value of a curvature radius of an exit surface in the sub-scanning section including an optical axis, and
wherein the incident surface of the first optical element is configured to reflect the light beam entering the incident surface toward a direction of separating from a main scanning section including the deflector in the sub-scanning section including the optical axis.

13. An image forming apparatus according to claim 12, further comprising a printer controller configured to convert code data output from an external apparatus into an image signal, and to input the image signal to the optical scanning apparatus.

* * * * *